(12) United States Patent
Hayashi et al.

(10) Patent No.: US 7,986,121 B2
(45) Date of Patent: Jul. 26, 2011

(54) INVERTER APPARATUS AND A SEMICONDUCTOR DEVICE USED FOR THE SAME

(75) Inventors: Yoichi Hayashi, Kanagawa (JP); Tetsuya Fukumoto, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 600 days.

(21) Appl. No.: 12/081,830

(22) Filed: Apr. 22, 2008

(65) Prior Publication Data

US 2008/0265829 A1    Oct. 30, 2008

(30) Foreign Application Priority Data

Apr. 26, 2007  (JP) .................. 2007-116703

(51) Int. Cl.
  *H02P 27/04*    (2006.01)
(52) U.S. Cl. .................. 318/801; 318/781; 318/434
(58) Field of Classification Search .................. 318/801, 318/781, 434, 433, 432, 400.02, 400.15, 318/400.23, 400.07, 446, 730, 494, 721, 318/723, 806
  See application file for complete search history.

(56) References Cited

U.S. PATENT DOCUMENTS

2005/0178609 A1*  8/2005  Uryu .......................... 180/446

FOREIGN PATENT DOCUMENTS

| JP | 2003-235268 | 8/2003 |
| JP | 2003-324985 | 11/2003 |
| JP | 2004-225580 | 8/2004 |
| JP | 2006-230766 | 9/2006 |
| JP | 2006-230766 (A) | 9/2006 |

OTHER PUBLICATIONS

Chinese Office Action dated Feb. 12, 2011, with English translation.

* cited by examiner

*Primary Examiner* — Karen Masih
(74) *Attorney, Agent, or Firm* — McGinn Intellectual Property Law Group, PLLC

(57) ABSTRACT

An inverter apparatus is for correcting deviations among current detectors of a three-phase motor. The inverter apparatus includes bidirectional switching elements that have on and off states in the cases in which there are 1 and 0 mean on- and off-states. The states are alternately repeated by controlling the switches, and measurement for correcting the deviations among the current detectors are obtained in the state Currents have the same amplitude flow on a U phase and a V phase. In the state of normal use, the inverter apparatus is operated by correcting detected current values based on the measurement data.

13 Claims, 15 Drawing Sheets

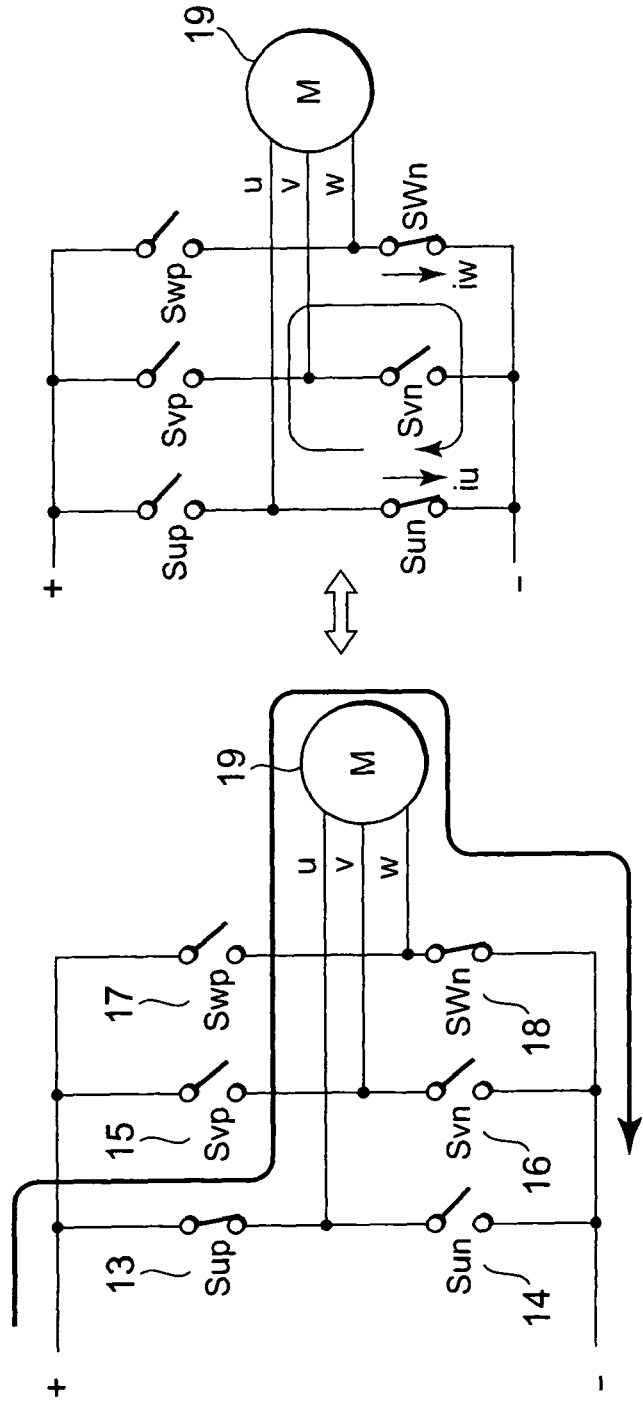
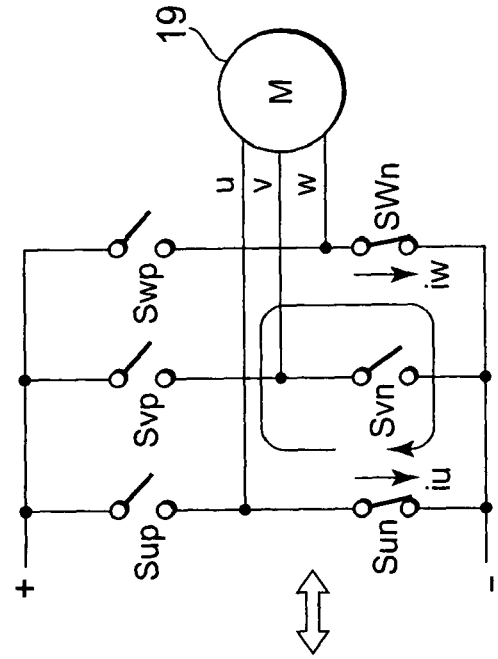
FIG. 4A
FIG. 4B
FIG. 4C (Related Art) FIG. 5A
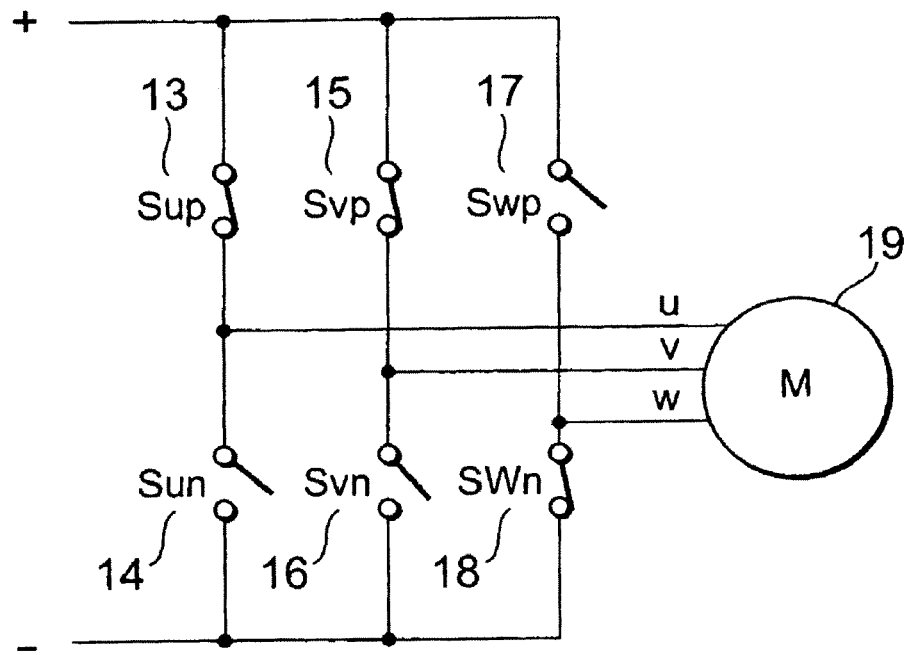
(Related Art) FIG. 5B
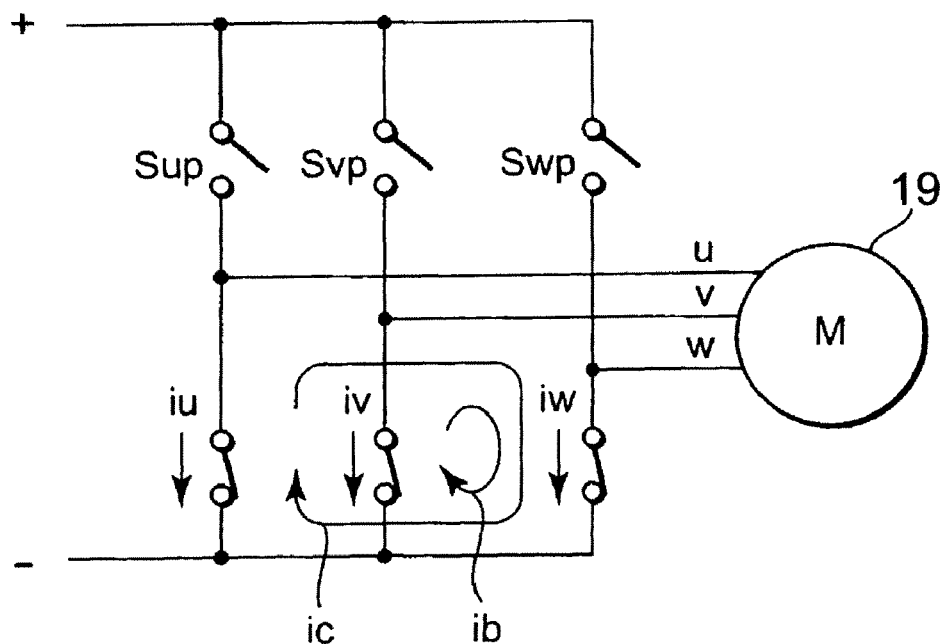

WHEN A POSITIVE CURRENT FLOWS ON U-PHASE AND
A NEGATIVE CURRENT HAVING THE SAME AMPLITUDE
FLOWS ON W-PHASE IN THE CASE OF MEASURING
RESISTANCE BETWEEN U AND W,
A MAGNETIC FIELD IS GENERATED ALONG A DIRECTION OF
A COIL OF V-PHASE AS SHOWN IN THE DRAWING.
THE ROTATOR IS FIXED IN THE DIRECTION OF THE COIL OF
THE V-PHASE.

INVERTER APPARATUS AND A SEMICONDUCTOR DEVICE USED FOR THE SAME

BACKGROUND OF THE INVENTION

1. Field of the Invention

The present invention relates to an inverter apparatus configured to execute instantaneous current control and thereby to drive motors including three-phase alternating-current motors (such as an induction motor or a permanent magnet synchronous motor) and to a semiconductor device and the like used for the same.

2. Description of the Related Art

Today, inverter apparatuses configured to execute instantaneous current control are widely used in refrigerating and air-conditioning machines, air blowers, washing machines, compressor drivers, and the like. Vector control is widely applied to control of, particularly, alternating-current motors such as induction motors or permanent magnet synchronous motors. Put simply, the vector control is a control method by means of detecting a motor current and performing special calculation to separate the motor current into a magnetic flux component and a torque component. When changing a motor output, for example, it is possible to achieve efficient control by controlling only a torque current.

Hence, in order to perform the vector control, it is necessary to detect alternating current that flow in each phase of a motor in principle. Three-phase induction motors and permanent magnet synchronous motors configured to flow three-phase alternating currents are widely used in this regard. FIG. 1 shows an example of a detection circuit that uses shunt resistors for detecting currents on a permanent magnet synchronous motor (hereinafter also abbreviated as PMSM) Although hall elements have been often used in detection circuits in the past, shunt resistors are frequently used today. This is because the shunt register has features including a smaller external shape and a more excellent temperature characteristic than the hall element.

As shown in FIG. 1, a method of detecting currents by using three shunt resistors 131, 132, and 133 is called a three-shunt detection method. The method will be briefly described as follows. For example, in the case of current detection of a U-phase, a voltage between both ends of the shunt resistor 131 are amplified with an operational amplifier 134, while a current Iu that is AD-converted with an AD (analog to digital) converter 151 included in a microprocessor (hereinafter also referred to as a microcomputer) 150 is sent to a motor controller 160. The publicly-known vector control is performed here. Based on a result of the control, a PWM (pulse-width modulation) generator 152 outputs a signal for controlling a switching element, and thereby the switching element is controlled. Current flow to the motor is eventually controlled. In the meantime, a method of detecting current values of two phases out of three phases by using a relation of Iu+Iv+Iw=0 is called a two-shunt detection method. Further, there is also proposed a single-shunt detection method which is configured to estimate currents of each phase by detecting a direct-current value using a single shunt resistor instead of using multiple shunt resistors and thereby to perform the vector control.

However, due to its nature, the single-shunt detection method faces many practical problems in order to achieve efficient control with a simple configuration. One of the problems is that the method requires high performance and high speed for microprocessor for controlling the inverter and the like.

The three-shunt detection method is the best among these methods of performing the vector control using the shunt resistors from the viewpoint of ease of control. However, the three-shunt detection method requires current detection at high accuracy. Therefore, it is essential to avoid deviations in resistance values among the three shunt resistors, variation in the resistance values with time, and so forth. In this context, Japanese Patent Application Publication No. 2004-225580 (hereinafter referred to as Patent Document 1) discloses a technique for reducing deviations in electrical resistance values attributable to variation in welding operations for attaching shunt resistors to an inverter-integrated electric compressor, for example. Moreover, Japanese Patent Application Publication No. 2003-235268 (hereinafter referred to as Patent Document 2) discloses a technique for correcting resistance values of shunt resistors by executing temperature measurement in order to prevent deviations in temperature characteristics of the shunt resistors in the case of a rise in temperature of a motor.

Meanwhile, although a voltage between both ends of each of the shunt resistors are amplified by use of the operational amplifier 134, 135 or 136 as shown in FIG. 1 in many cases, an offset attributable to its temperature characteristic may be caused in the operational amplifier. An accurate current value cannot be obtained with an offset caused in an operational amplifier even if a shunt resistor detects an accurate potential difference in each phase. Based on this concept, Japanese Patent Application Publication No. 2003-324985 (hereinafter referred to as Patent Document 3) discloses a motor control device which is capable of canceling an influence of temperature variation, detecting a current accurately, and thereby achieving appropriate motor control.

As described above, substantial efforts have heretofore been devoted to improvement in accuracy of resistance measuring means including the shunt resistor and the operational amplifier. In other words, tremendous efforts have been devoted to pursuit of higher accuracy of a current detector. Nevertheless, this attempt contradicts market demands such as cost reduction.

Meanwhile, as opposed to the pursuit of higher accuracy of the current detector that has been the conventional problem-solution approach for avoiding deviations in resistance values among shunt resistors, Japanese Patent Application Publication No. 2006-230766 (hereinafter referred to as Patent Document 4) discloses a washing machine motor capable of preventing occurrence of output torque fluctuation as much as possible even when a current detector for detecting a current flowing on each phase of an inverter has poor detection accuracy. FIGS. 2A and 2B show a method disclosed in Patent Document 4. In the method, to describe it shortly, a voltage is applied to each coil of the three phases at the time of product shipment or service in the market, and then an average value of currents flowing at that moment is measured. Based on the average value, a correction coefficient is found, and thereby resistors are corrected. At the time of normal use, a current correction value is found based on the value of the correction that is given, by use of the correction coefficient.

SUMMARY

As described previously, providing a current detector with high accuracy is not a favorable problem-solution approach, and it is preferable to provide a motor system and an inverter which can fulfill their functions, albeit at poor detection accuracy, as described in Patent Document 4.

However, the invention disclosed in Patent Document 4 has a problem as follows. As described above, a voltage is applied to each coil of the three phases, and the resistance values are corrected by measuring the average value of the currents flowing at that moment. Accordingly, it is necessary to carry out three sessions of measurement in terms of a U-phase, a V-phase, and a W-phase. Moreover, a detection value obtained by one session of measurement is for only one phase. In short, since the phases are measured separately, the measured values differ from each other depending on the time of each measurement, thereby causing deviations in the values. The values here include resistance values of the coils in the motors and inductance values. These deviations may degrade a performance of a motor control device.

Besides the deviated values of the coil resistances, the performance of the motor control device is also degraded by the deviations of resistance values of shunt resistors, the deviations of amplification degrees of operational amplifiers, or the like, among the phases. This mechanism will be described in detail with reference to FIG. 3. FIG. 3 is a functional block diagram of the motor controller 160 shown in FIG. 1. As shown in this drawing, a detected motor current iu and others are used by a torque controller Iq*, a motor position and speed estimator (ω_es, θ_es), and the like. If a motor current having uneven phases is applied to the motor controller 160, ripples may cause in the torque or in estimated speeds. These ripples could degrade performance of a control system. Accordingly, the resistance values and other factors among the three shunt resistors need to be corrected so as to be equal to each other.

To put it in plain words, as is generally known, in order to obtain an ideal state of control of the motor, it is preferable that amplitudes of the currents of the three phases be identical to one another on time axes defined in consideration of phase differences. That is to say, it is preferable that current waveforms of the three phases be identical to one another in consideration of the phase differences. This state is here defined as a balanced state of the currents of the three phases. If the current detector causes deviation in the detection performance or other unevenness due to existence of detection deviation or the like, detection error attributable to the current detector occurs. As a consequence, the detected currents are judged not to be balanced, i.e. imbalanced even when the currents are actually balanced. Moreover, since the control system shown in FIG. 3 performs feedback in order to maintain the torque and the speed to constant level, the control system attempts to suppress the imbalance which does not actually exist. As a consequence, the control system becomes unstable by contraries.

That is to say, the conventional solution approach aims at obtaining absolute accuracy of the current detector and intends to improve accuracy and to eliminate the deviation at the same time. Another conventional solution approach intends to eliminate the deviation by averaging the current detectors as described in Patent Document 4. In contrast with the conventional solution approach described above, the inventor of the present invention has found out that a more appropriate solution approach is to achieve a control method which is capable of eliminating the unevenness virtually even if the current detector contains the unevenness. This is because such a control method is capable of achieving lower costs, improving ripples in the torque and the speed, which represent extremely important factors in view of the functions of a three-phase motor, and stabilizing the control.

An inverter apparatus of the present invention is an inverter apparatus configured to operate a three-phase motor. The inverter apparatus includes switching elements, current detectors, and a controller. The switching elements control application of electric power to each phase of the three-phase motor. The current detectors have shunt resistance elements and are provided on at least two phases out of the three phases. The controller controls the switching elements. Here, the controller controls the switching elements to render one phase out of the three phases nonconductive and to supply electric currents to the two phases each provided with the current detector, and thereby to find a correction value based on information obtained from the current detectors.

The gist of the present invention is as follows. In order to detect and correct an imbalance among the current detectors of each phase, currents having equal amplitude (an absolute value) are supplied to the two phases out of the three phases while rendering the remaining phase nonconductive. Deviations among the current detectors measured at this time are detected to find the correction value. In this way, it is possible to provide the inverter apparatus which is not influenced by the uneven performances among the current detectors such as shunt resistors.

A semiconductor device of the present invention is a semiconductor device, which is used for an inverter apparatus configured to operate a three-phase motor. The inverter apparatus includes: switching elements configured to control application of electric power to each phase of the three-phase motor; and current detectors having shunt resistance elements and being provided on at least two phases out of the three phases. Meanwhile, the semiconductor device includes a controller configured to control the switching elements. Here, the controller controls the switching elements to render one phase out of the three phases nonconductive and to supply electric currents to the two phases each provided with the current detector, and thereby to find a correction value based on information obtained from the current detectors. That is, the semiconductor device controls the inverter apparatus of the present invention.

Meanwhile, a method of starting operation of a three-phase motor of the present invention is a method of starting operation of a three-phase motor having an information correcting function for current detectors of a three-phase motor including the current detectors having shunt resistance elements and being provided on at least two phases out of the three phases, and switching elements. The method includes the steps of: supplying a measurement current for correction of output from each of the current detectors before normal operation of the three-phase motor; after supplying the measurement current, supplying currents to the two phases of the three-phase motor each provided with the current detector while stopping the current supply to the remaining phase, to obtain information from the current detectors of the two phases; finding a correction value based on the obtained information; and causing the three-phase motor to perform normal operation based on the correction value. That is, the present invention can be also grasped as the method of starting the operation of the three-phase motor.

Accordingly, even if the current detectors have intrinsic unevenness, the present invention can solve the unevenness. As a result, it is possible to obtain an inverter apparatus and the like which are capable of achieving lower costs, improving torque and speed ripples, and stabilizing the control.

BRIEF DESCRIPTION OF THE DRAWINGS

FIGS. 4A to 4C are principle diagrams showing the gist of the present invention.

FIGS. 5A and 5B are views showing a case of an attempt to perform a similar action based on a conventional fixed concept.

DETAILED DESCRIPTION OF THE EMBODIMENTS

Figure 1:
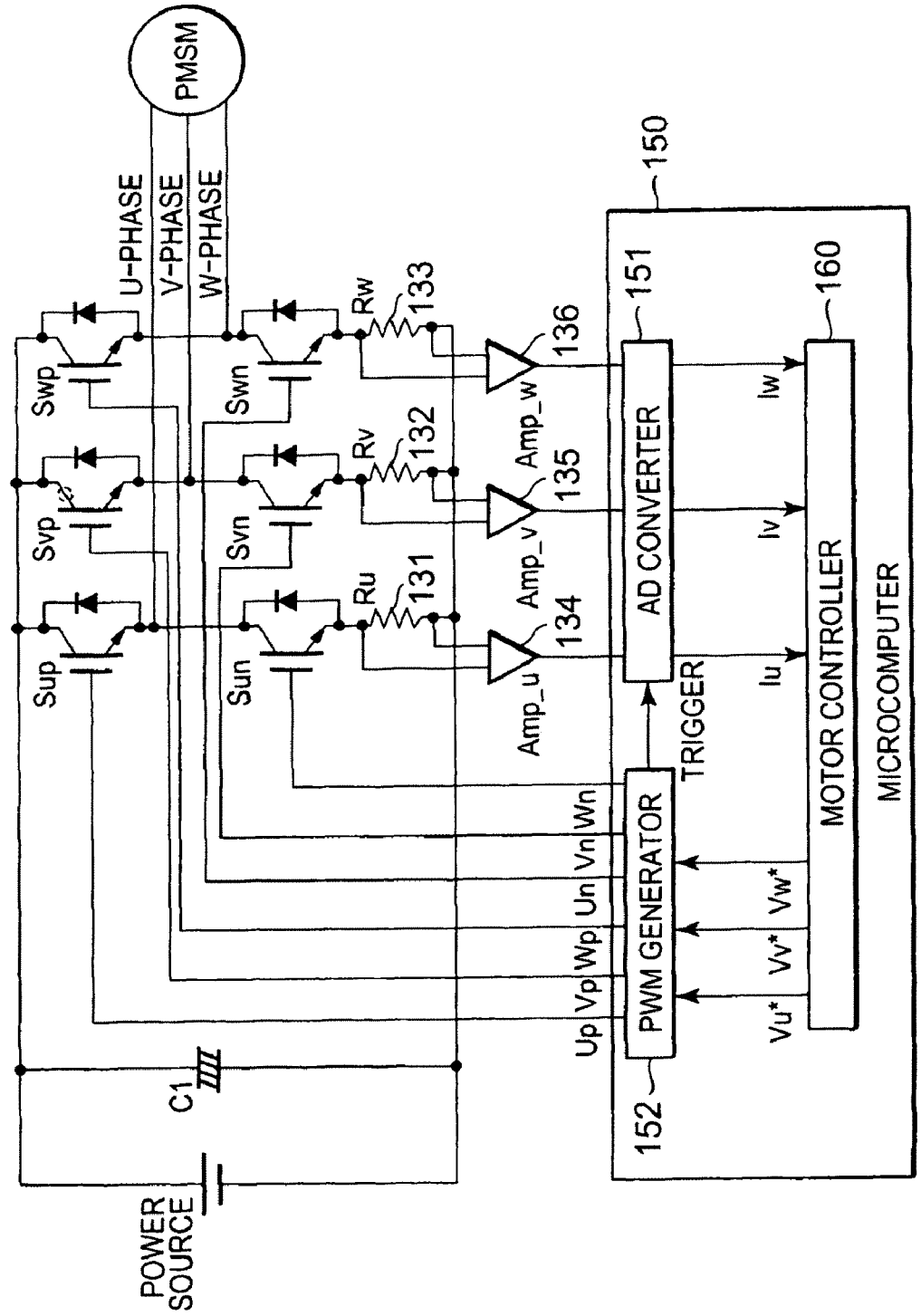
FIG. 1 is a block diagram showing an example of a configuration of a conventional motor control device.
Figure 2A:
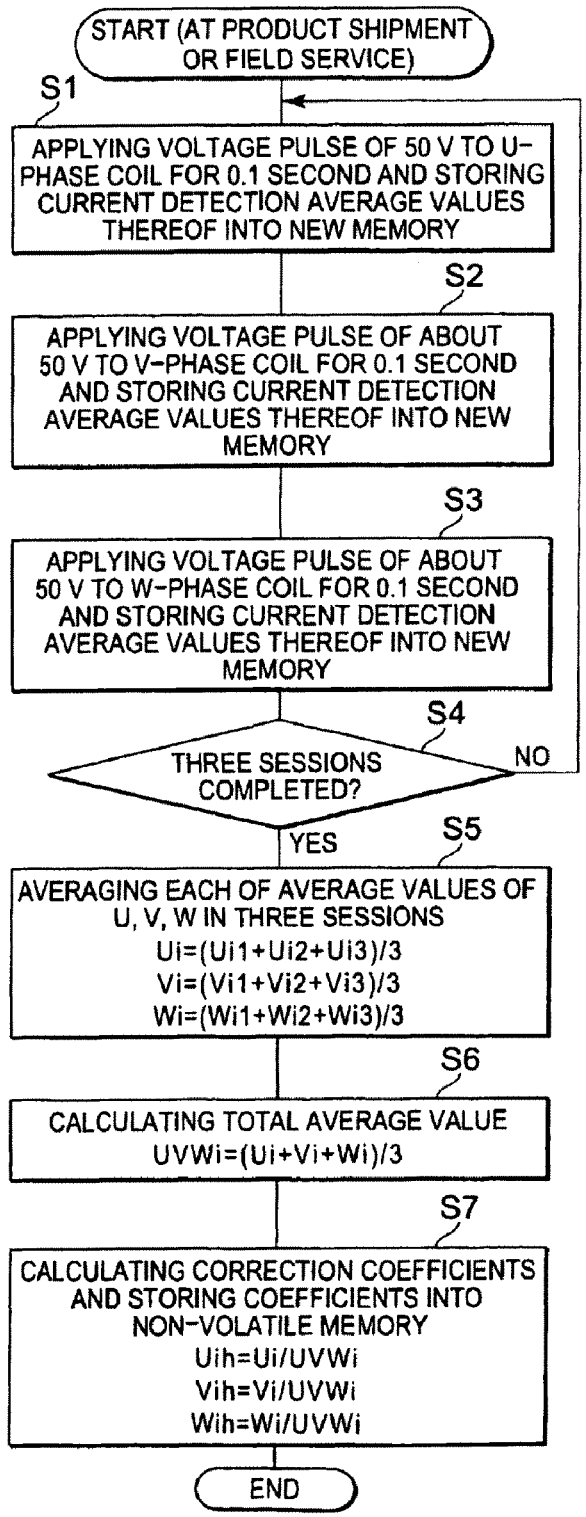
FIGS. 2A and 2B are flowcharts of control disclosed in Patent Document 4.
Figure 2B:
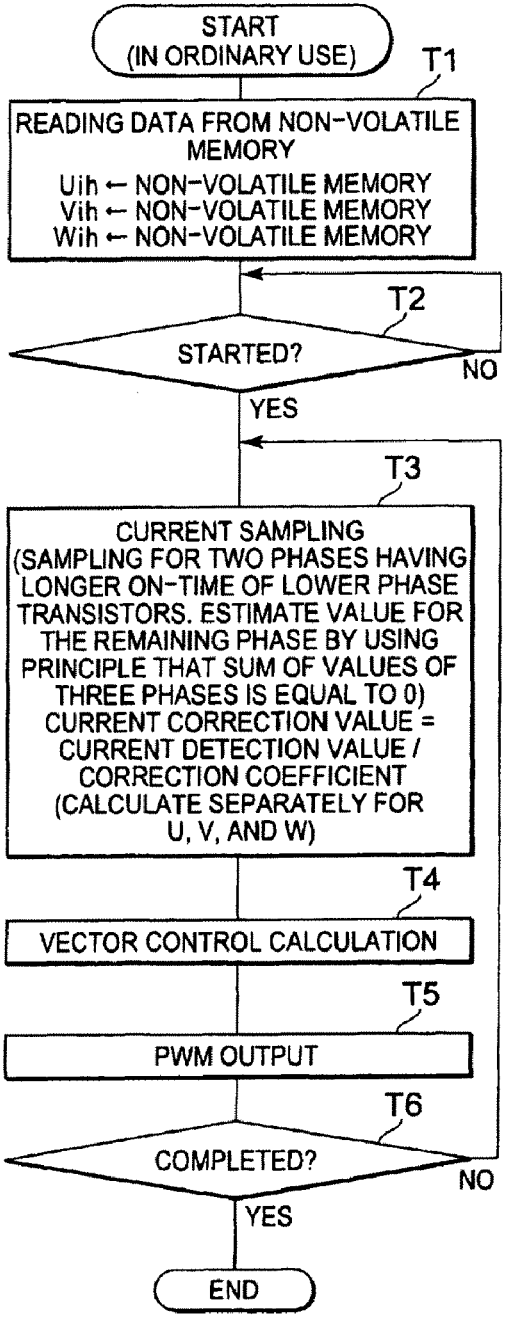

First, FIGS. 4A, 4B, and 4C show examples of principle diagrams for explaining the gist of the present invention. FIGS. 4A and 4B are principle diagrams for correcting deviation among current detection means of a three-phase motor in an inverter apparatus according to the present invention. Both of FIGS. 4A and 4B receive power from an unillustrated direct-current power source. The "+" side in each of the drawings represents a positive electrode side of the direct-current power source, while the "−" side therein represents a negative electrode side of the direct-current power source. In the drawings, reference numerals 13, 14, 15, 16, 17, and 18 denotes bi-directional switches. Meanwhile, reference numeral 19 denotes a three-phase motor having three phases of U, V, and W. Note that the reference numerals are omitted in FIG. 4B for avoiding complication, but the switches in FIG. 4B have the same reference numerals as those appearing in FIG. 4A. FIG. 4C expressly describes on-states and off-states of the switches of FIG. 4A and FIG. 4B, in which 1 represents the on-state and 0 represents the off-state. In the state shown in FIG. 4B, measurement data for correcting deviation of current detectors are obtained by switching the states shown in FIGS. 4A and 4B alternately by controlling the switches. It is not always necessary to change the states alternately, and is also possible to change the state only once. This case will be described later.

Next, the states shown in FIGS. 4A and 4B will be described further in detail. First, in the state shown in FIG. 4A, an unillustrated controller controls the switches such that Sup 13 being one of the switches of the U-phase and Swn 18 being one of the switches of the W-phase are turned on, while the rest of the switches are turned off. That is, the switches of the V-phase are turned off. Next, as shown in FIG. 4B, the unillustrated controller controls the switches such that the switch Sup of the U-phase is turned off and the switch Sun of the U-phase is turned on, while the rest of the switches remain the same as FIG. 4A. In this way, currents iu and iw flow on the U-phase and the W-phase, respectively, as shown in FIG. 4B. Here, when the directions of the currents are defined as shown in FIG. 4B, iu+iw=0, and iu=−iw hold true. Therefore, amplitudes (absolute values) of the currents flowing in this case are equal at a certain time instant. Accordingly, when the two current values are detected at the same time, the detected current values are supposed to be equal to each other provided that the current detectors have the same accuracy (values obtained by multiplying values of shunt resistors by amplification factors of amplifiers). The present invention is configured to perform correction by using this principle. In other words, the present invention is configured to control the switching elements to render one phase out of the three phases nonconductive and to supply the electric currents to the two phases each provided with the current detector, and thereby to find the correction value based on information obtained from the current detectors. Here, the information is obtained from both of the current detectors at the same time. That is, the information is obtained by supplying the currents having the same amplitude. A concrete example for this will be described later in detail.

In FIG. 4B, the currents flow in a closed circuit without a power source therein. This is attributable to electric energy (back electromotive force) accumulated in an unillustrated coil (inductance) of the motor 19. Therefore, it is not possible to continue the measurement for a long period of time. Accordingly, the process shown in FIG. 4A is required for supplying the back electromotive force to the unillustrated coil of the motor 19. Therefore, in order to repeat the measurement for several times, the method of switching the states shown in FIGS. 4A and 4B alternately is the most common and the simplest method. A concrete example for this will be described in detail in the following explanation of the embodiments.

Incidentally, an example of conventional motor control will be described with reference to FIGS. 5A and 5B just for information. The configurations of the switches, the motor, and others in FIGS. 5A and 5B are similar to those shown in FIGS. 4A and 4B. FIG. 5A shows an example of motor control during normal operation, which is configured to control the switches so as to turn on one of the switches in each phase and turn off the other switch in each phase. For example, in FIG. 5A, the switches 13, 15, and 18 are turned on, while the rest of the switches are turned off. Specifically, the switches Sup, Svp, and Swn are turned on while the rest of the switched are turned off. In this way, the current flow on all phases.

FIG. 5B shows an attempt to form a closed circuit for current measurement on the basis of the conventional fixed concept for motor control, in which one of the switches in each phase is turned on and the other switch in each phase is turned off. In FIG. 5B, ic=iw−iu and ib=iw−iv hold true when the directions are taken into account. That is, although it is apparent that ic+ib=2iw−(iu+iv), i.e. iw=ic+ib holds true, it is not possible to find the values of iv and iu. Therefore, a switching operation based on this conventional fixed concept cannot equalize the currents that flow on the respective phases. As a natural consequence, it is not possible to achieve correction of the deviation among the current detectors, namely, correction of the information outputted from the current detectors.

First Embodiment

Figure 6:
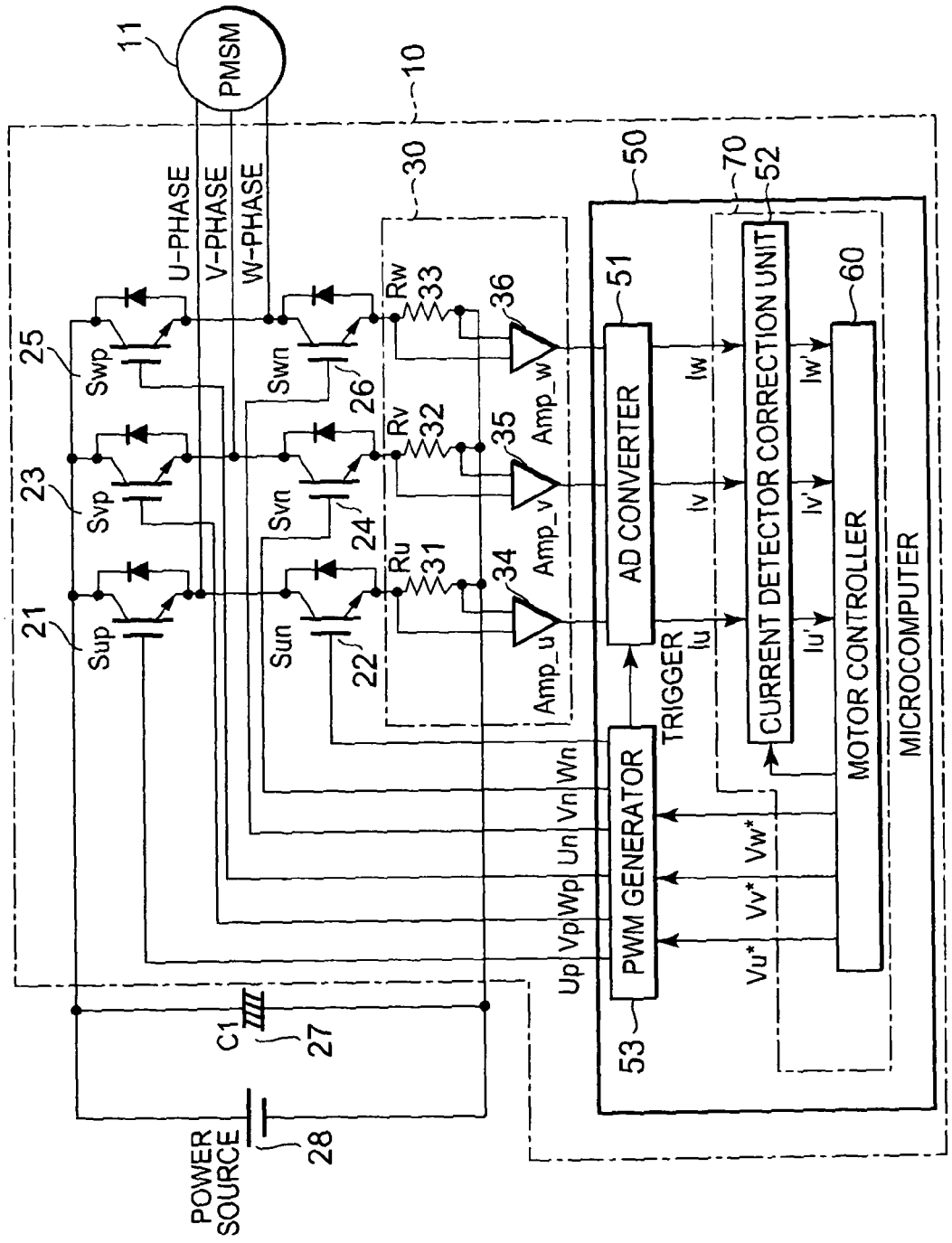
FIG. 6 is a block diagram showing a configuration of an inverter apparatus according to a first embodiment of the present invention.

FIG. 6 shows an inverter apparatus 10 according to a first embodiment of the present invention. Although this drawing seems similar to FIG. 1 described in the Related Art, a key difference therebetween is that this configuration includes a current detector correction unit 52 for performing correction of an imbalance among the current detectors explained in the principle diagrams. In the drawing, reference numeral 50 denotes a microcomputer, which is configured to control the switching elements, i.e. to perform motor control, and is usually formed of a semiconductor device. Moreover, although it is not shown in the illustration of the inverter apparatus in FIG. 6, this configuration also has other features such as a method of controlling the switching elements in order to perform correction of the deviation among the current detectors, for example. In this way, the first embodiment can also be grasped as the invention of a motor controlling method using the inverter apparatus 10 or specifically as a motor operation starting method, as the invention of a semiconductor device configured to control switching elements, and as the invention of a control program for controlling the inverter apparatus and the semiconductor device.

FIG. 6 illustrates the entire configuration again because it is necessary for the overall understanding of the explanation for operations to be described later. In the drawing, reference numeral 11 denotes a PMSM. Reference numerals Sup 21, Svp 22, Swp 23, Sun 24, Svn 25, and Swn 26 denote switching elements. For example, the Sup 21 is the switching element located on an upstream side of the U-phase (the side where one end of the element is connected to an anode side of a direct-current power source) and the Sun 22 is the switching element located on a downstream side of the U-phase (the side where one end of the element is connected to a cathode side of a direct-current power source) Meanwhile, the reference numerals 21, 23, and 25 are also referred to as upper arm switching elements, and the reference numerals 22, 24, and 26 are also referred to as lower arm switching elements. Publicly-known MOSFETs (metal oxide semiconductor field effect transistors) and IGBTs (insulated gate bipolar transistors) are used for the switching elements, for example. As apparent from the drawing, each phase includes two switching elements.

As shown in FIG. 6, each of the switching elements usually incorporates a diode. Although it is not illustrated in the drawing, the diode may be externally provided. Reference numeral 27 denotes a capacitor for ripple removal. A large-capacity aluminum electrolytic capacitor and the like are used as this capacitor 27. A power source 28 is a direct-current power source. Although externally attached to the inverter apparatus 10 in the drawing, the capacitor 27 and the power source 28 may also be incorporated in the inverter apparatus instead, of course.

The explanation of FIG. 6 will be continued. Reference numerals 31, 32, and 33 denote shunt resistance elements configured to measure the currents of the U-phase, the V-phase, and the W-phase, respectively. In addition to the conventional shunt resistors, extremely low-price resistor elements including an element formed by cutting a metal body such as a conductive wire into a predetermined shape can be used for these shunt resistor elements as long as the elements has an appropriate shape and is made of an appropriate material in consideration of an influence to magnetic flux and of current capacities. For this reason, these elements are named as the shunt resistance elements in order to be distinguished from the shunt resistors described in the Related Art.

Reference numerals Amp_u 34, Amp_v 35, and Amp_w 36 denotes amplifiers, each of which is configured to find a voltage between both ends of the shunt resistance element on the U-phase, the V-phase or the W-phase, respectively. An operational amplifier is used for the amplifier, for example. As will be described later, this amplifier does not require very high amplification accuracy, either. The current detector is constituted of resistance detecting means such as the shunt resistance element and voltage amplifying means such as the amplifier configured to amplify the voltage between both ends of the resistance detecting means. For example, Ru 31 and Amp_u 34 collectively constitute the current detector of the U-phase. The current detectors are indicated in a region 30 surrounded by a dashed line.

As described previously, the inverter apparatus 10 includes the microcomputer 50 for motor control, or more specifically, for controlling the switching elements. The microcomputer 50 further includes an AD (analog-to-digital) converter 51 configured to convert analog values obtained from the current detectors into digital data, and the current detector correction unit 52 which is a characteristic feature of the present invention. Although the AD converter 51 is expressed as a single block in the drawing, it is preferable to prepare the AD converter for each amplifier. That is, it is preferable to receive output data from the current detectors at the same time and to perform the AD conversion of the data individually. In other words, it is preferable to achieve simultaneous measurement. Therefore, although not illustrated in FIG. 6, three AD converters are provided in the microcomputer 50. The same is true to the current detector correction unit 52. Nevertheless, a single AD converter may be provided when the AD converter is capable of performing AD conversion at an extremely high speed and thereby performing high-speed measurement that can ignore delays in sampling time. In other words, it is possible to provide only one AD converter if the AD converter can perform measurement within a time width in which the currents (amplitude values) flowing on the two shunt resistance elements are deemed to be virtually equal to each other. Further, the microcomputer 50 includes a motor controller 60 to be described in detail in FIG. 7 and a PWM (pulse width modulation) generator 53 for controlling a pulse width to perform pulse width modulation control. Here, as the entire microcomputer 50 performs the operations for controlling the motor and the inverter apparatus, the entire microcomputer 50 may also be called a motor controller or an inverter apparatus controller in a broad sense. Moreover, it is also possible to incorporate the current detector correction unit 52 into the motor controller 60 and thereby to form a current detector correction unit-incorporated motor controller 70.

Normally, the microcomputer 50 is formed of a single-chip semiconductor integrated circuit device (hereinafter also abbreviated as an LSI (large-scale integrated circuit) or a semiconductor device). Naturally, it is also possible to locate the AD converters 51 and the PWM generator 53 outside the microcomputer and use these components as unillustrated discrete AD converters and a discrete PWM generator. Here, the microcomputer includes only the current detector correction units 52 and the motor controller 60. In this case, the motor controller in the broad sense according to the present invention includes at least the microcomputer and the PWM generator.

Figure 3:
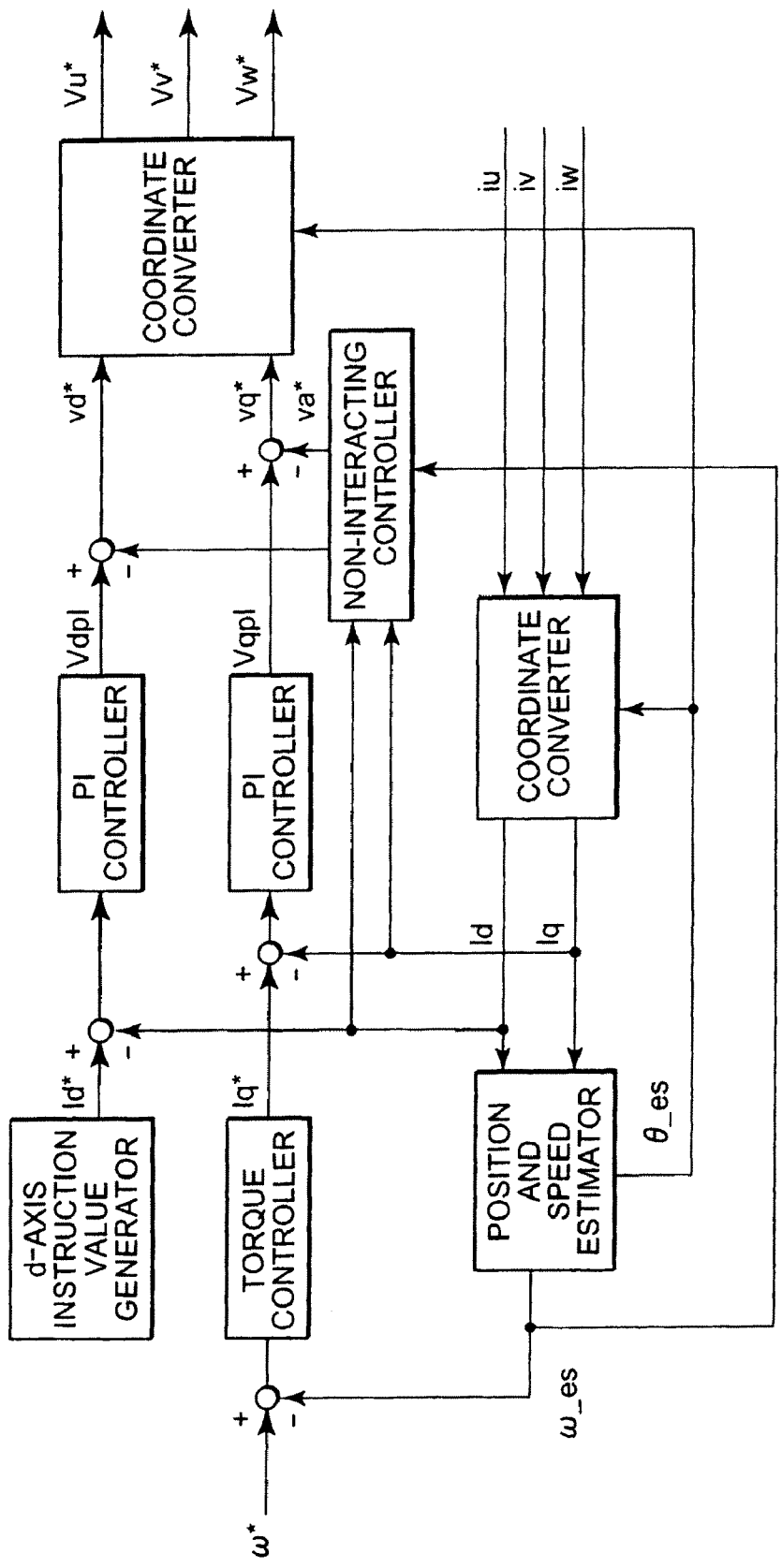
FIG. 3 is a block diagram showing an example of a configuration of a conventional motor controller.
Figure 7:
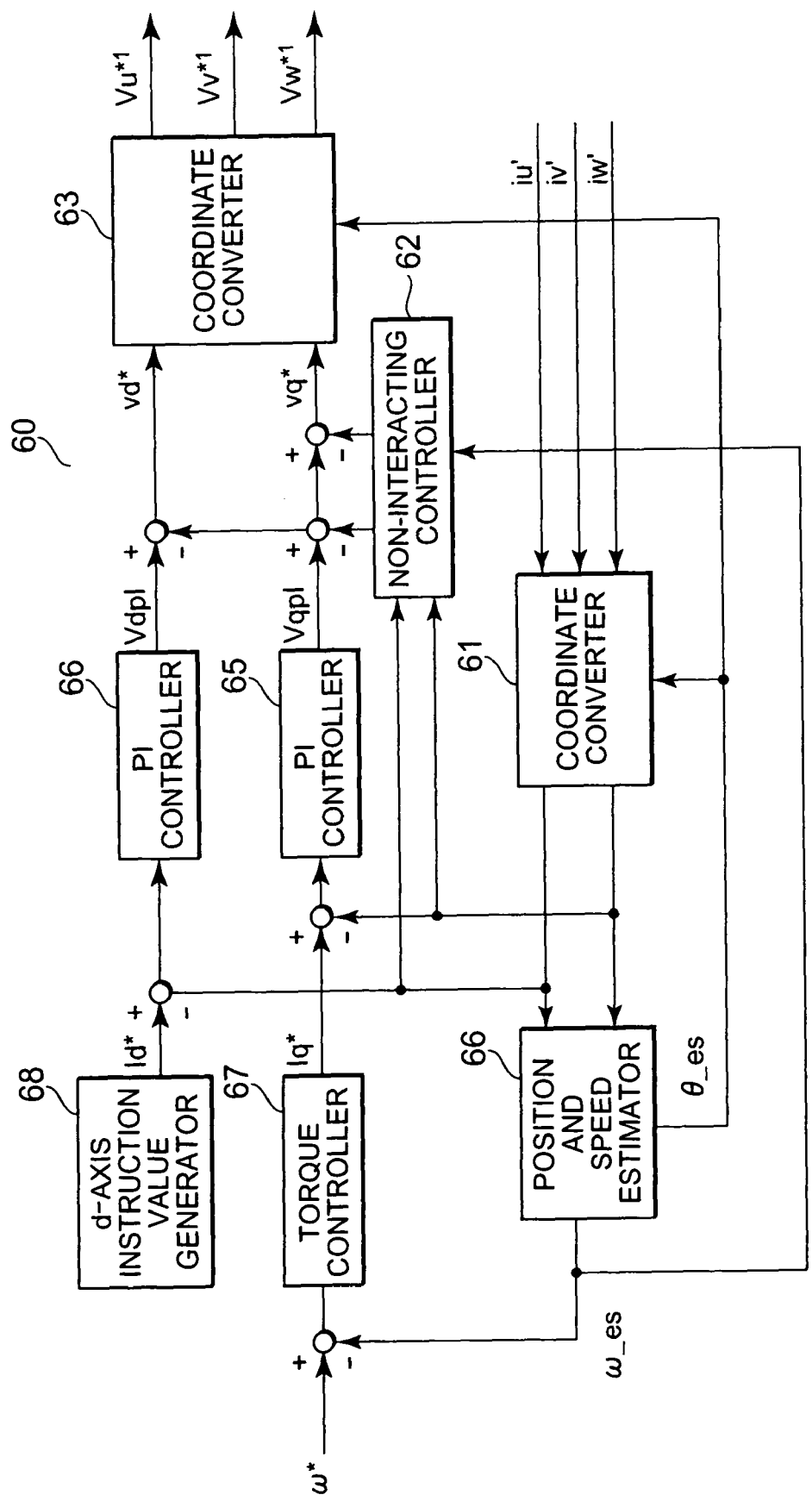
FIG. 7 is a block diagram showing a configuration of a motor controller according to the first embodiment of the present invention.

FIG. 7 shows a configuration example of the motor controller 60. FIG. 7 is based on publicly-known vector control. This drawing is similar to FIG. 3 describing the Related Art.

Specifically, although the characteristic features of the present invention do not appear in this FIG. 7, this drawing is placed hereon again as it may be necessary for explaining the characteristic features of the present invention later. Therefore, the drawing will be briefly described at this moment. Reference numerals 61 and 63 denote publicly-known coordinate converters. The coordinate converter 61 receives current value data (such as iu') of each phase obtained by correcting a current value (such as iu) obtained by the AD converter 51 on the basis of a later-described correction value obtained by the current detector correction unit 52. Reference numeral 62 denotes a publicly-known non-interacting controller. Reference numeral 66 denotes a publicly-known position and speed estimator, and reference numeral 67 denotes a publicly-known torque controller. Reference numeral 68 denotes a publicly-known d-axis instruction value generator. Reference numerals 64 and 65 perform publicly-known PI (proportional-integral) control. Values Vu*', Vv*', and Vw*' are generated as instruction values for controlling the voltages of the phases and are outputted from the coordinate converter 63 to the PWM generator 53. Here, the expressions such as Vu*' are used for describing inputs and outputs in consideration of a state of receiving the current value data (such as iu') of each of the phases obtained by correcting the current values (such as iu) obtained by the AD converters 51, i.e. a state of normal operation. Needless to say, an operation for acquiring correction data is carried out at a stage of obtaining correction data in accordance with a prescribed program or the like included in the controller. In FIG. 6, the instruction values for controlling the voltage of each phase are indicated as Vu*, Vv*, and Vw* as the case in FIG. 1 for describing the Related Art. The reason for using the different reference codes from those used in the above-described state of normal operation is as follows. Specifically, in the overall block diagram shown in FIG. 6, the apparatus may also perform later-described measurement for correction. Accordingly, the reference codes are changed merely for indicating that general instruction values for controlling the voltage of each phase are outputted. On the other hand, FIG. 7 intends to put priority on plainly explaining conditions in the actual state of normal operation.

Now, characteristic features, means, and method of the first embodiment of the present invention will be described further in detail.

Figure 8:
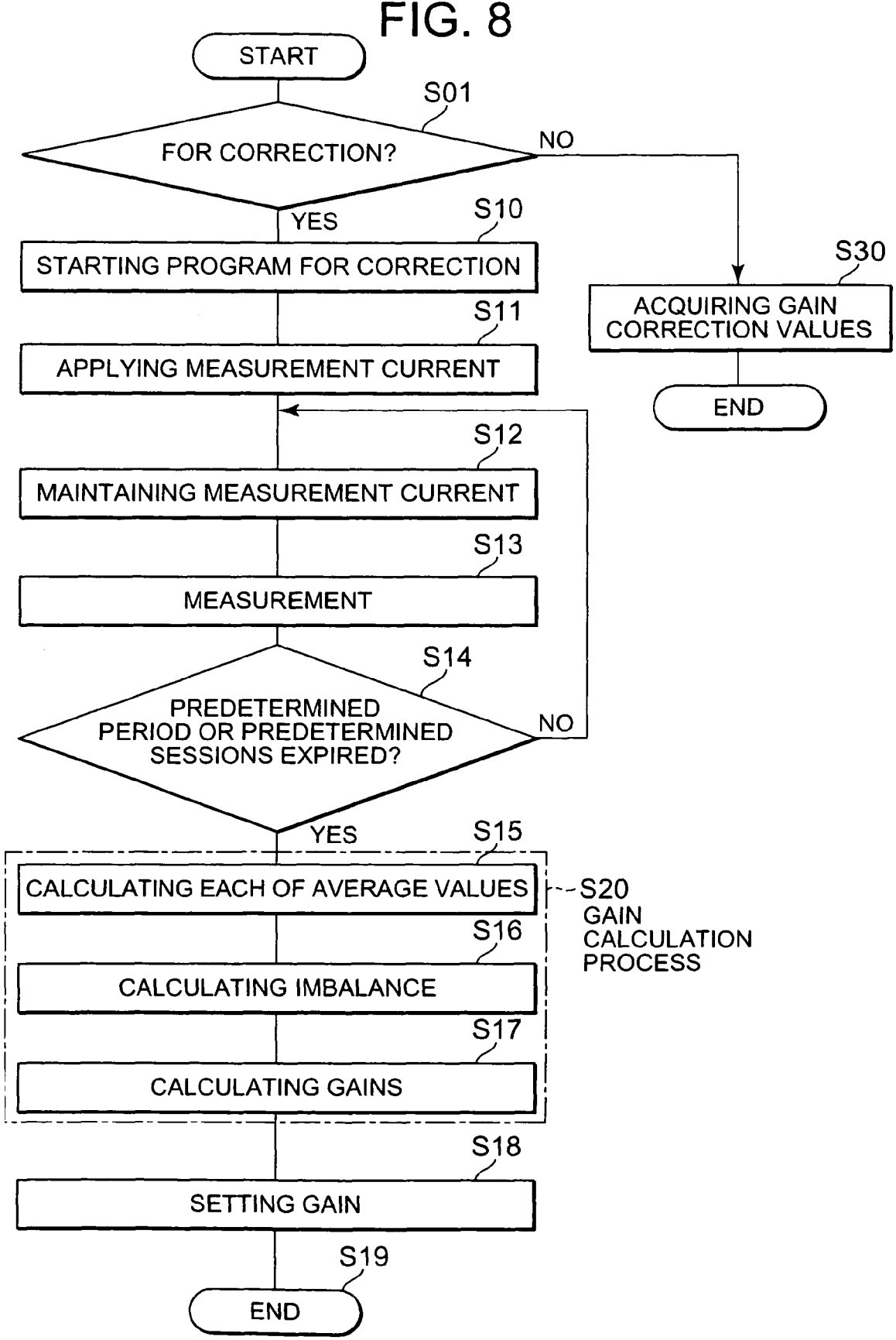
FIG. 8 is a flowchart showing acquisition of a correction value and so forth according to the present invention.

FIG. 8 shows a flowchart in the case of performing measurement for correction as well as of performing measurement for normal operation, using the present invention. When detailed explanation of each step is described later, this flowchart will be used again as appropriate for the purpose of comparison. However, the overall outline will now be described to begin with. Regarding concrete operations in this flowchart, the units such as the motor controller 60 in the microcomputer 50 output instructions and commands in a coordinated manner. Moreover, programs for issuing the instructions and the commands are usually installed in the microcomputer 50. However, it is by all means possible to prepare separate programs, to allow the microcomputer 50 to read the programs, and to operate the microcomputer 50 after reading the programs.

First, an inquiry is made as to whether or not the measurement is intended for correction (S01). If the measurement is intended for correction, a correction program is started (S10). Then, a measurement current is initiated (S11) When a value of the measurement current reaches a certain preset level or when measurement current maintenance (S12) is established (see also FIG. 9), the measurement is started (S13).

Usually, a start-up preparation program is prepared in an unillustrated section of the motor controller 60 or the like of the microcomputer 50. This program is configured to make the inquiry as to whether the measurement is for correction or not, prior to the start of normal operation of the motor, i.e. a moment immediately after the power is supplied to the inverter 10 and the motor 11, and to start the correction program when the measurement is intended for correction (YES in S01).

Bringing the explanation back to S13 in FIG. 8, switching element control is performed synchronously with the measurement, i.e. ON and OFF values of each of the switching elements are set up, and then the measurement is started. In this setting process, it is also possible to determine ON and OFF periods of part of the switching elements in accordance with the PMW control to be described later. In short, this measurement is executed for obtaining the data shown in FIG. 4B. When the measurement for a predetermined period is completed (YES in S14), the correction values for the phases are obtained. These values are obtained in a gain calculation process to be described later and gains of the phases are then set up.

When the measurement is not intended for correction, i.e. when the measurement is intended for the normal operation (NO in S01), the current values from the AD converters 51 shown in FIG. 6 are corrected by using these gain values (S30) and defined as the current values to be inputted to the motor controller 60. The motor is controlled based on these current values. The series of controlling processes described in FIG. 8 are also performed specifically as control programs of each unit in the microcomputer 50. That is, the characteristic features of the present invention can also be performed as the programs on the microcomputer 50 for controlling the operation of the inverter apparatus, or on a storage medium of the programs. From this point of view, the present invention can also be grasped as a method of starting operation of a three-phase motor provided with a function to correct information from a current detector in the case where the three-phase motor includes the current detectors having shunt resistance elements and being provided on at least two phases out of the three phases, and the switching elements.

A circuit diagram, a timing pattern chart of the measurement current, a control block diagram, and the like for S12 and S13 in FIG. 8 will be described in detail with reference FIG. 9 to FIG. 13. S12 and S13 in FIG. 8 are steps for maintaining the measurement current and then performing the measurement, and constitute one of the features of the present invention.

Figure 9:
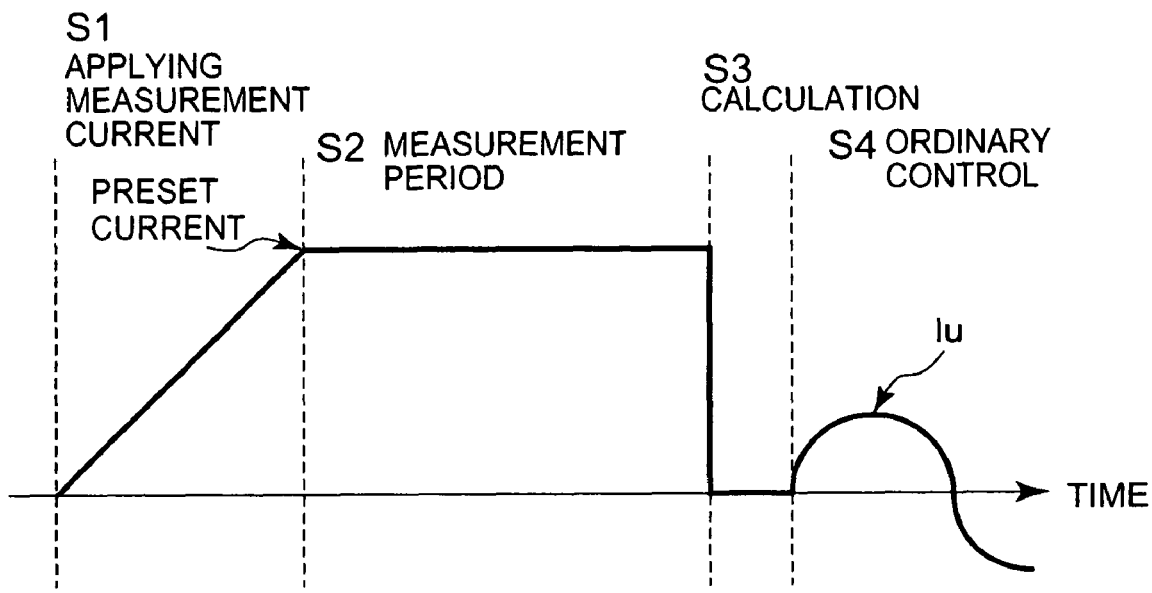
FIG. 9 is a graph showing an example of a current pattern and the like of measurement related to FIG. 8.

FIG. 9 is the pattern chart of the measurement current before the measurement and the subsequent normal control. When the program for correction is started as shown in FIG. 8 (S10), the measurement current is initiated (S11). As shown in FIG. 9, at an initiation stage S1 of the measurement current, the current is increased to a preset value in the form of a gentle ascending curve. This preset current is preferably set to a rated current of the motor to be driven. In a measurement stage S2, an imbalance among the current detectors such as the shunt resistance elements is measured. Here, the microcomputer 50 is usually preset by the program so as to start the program for correction immediately after the inverter apparatus and the motor power source are turned on to start the motor. Of course, it is also possible to start the program for correction either manually or by use of an instruction input from outside.

At a calculation stage S3, a correction gain of current detection value is calculated by using a result of the measurement of the imbalance among the current detectors. The pattern shown in FIG. 9 is a pattern of an instruction value, and an actual tracking performance of the current does not affect measurement accuracy. Note that FIG. 9 shows only one example and that the present invention can be achieved in any types of current patterns. The process goes to an normal control stage S4 after obtaining the correction gain. Concrete means for these stages will be descried later. In the drawing, the current value seems constant throughout the measurement stage S2. However, slight fluctuation of the value is allowable. That is, the current value may form a curved line instead of a straight line, and slight increase or decrease, or deviation does not affect much. Although it depends on a target of control, it is preferable to regulate such fluctuation within a certain range.

Figure 10:
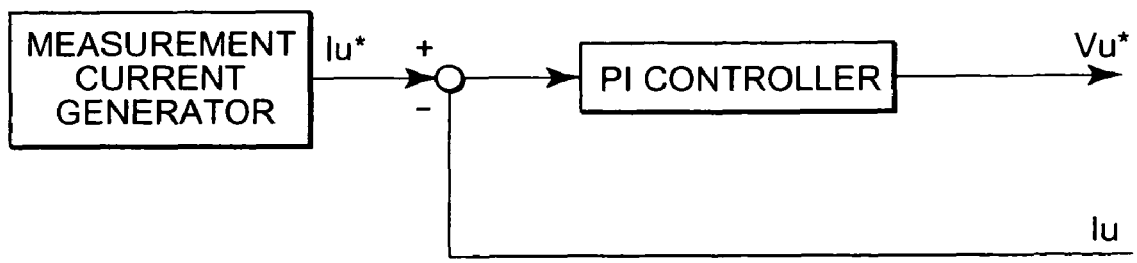
FIG. 10 is a control block diagram of a measurement current.

FIG. 10 is a control block diagram of the measurement current when performing the measurement for obtaining the correction value (S12 in FIG. 8) by applying the present invention. This is the drawing of an unillustrated control block in the controller 60 of the microcomputer 50 shown in FIG. 6. This control block is configured to be initiated before starting the normal operation of the motor. That is, PI control (proportional-integral control) is performed in order to control the pattern of the measurement current. This control is executed by a control program or the like incorporated in the microcomputer 50.

Figure 11:
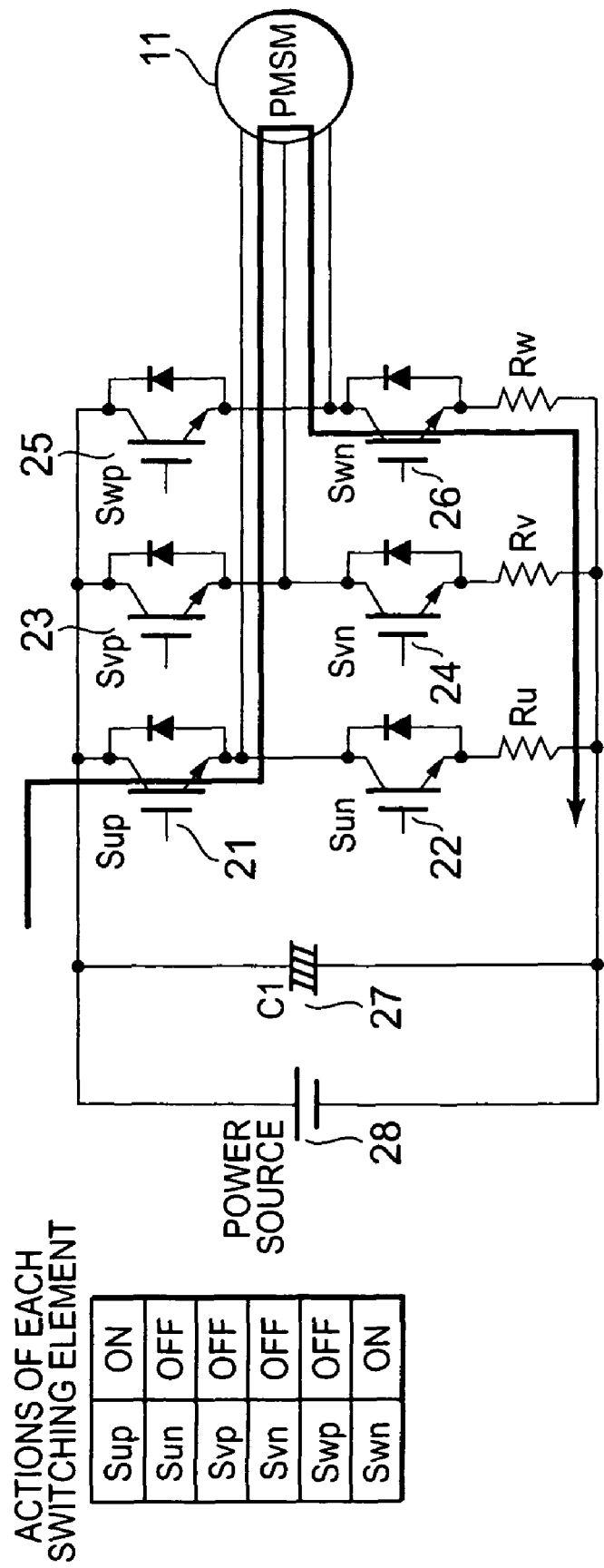
FIG. 11 is a view showing a passage of a current at the time of measuring current pattern resistance balance upon measurement of the correction value according to the present invention.
Figure 12:
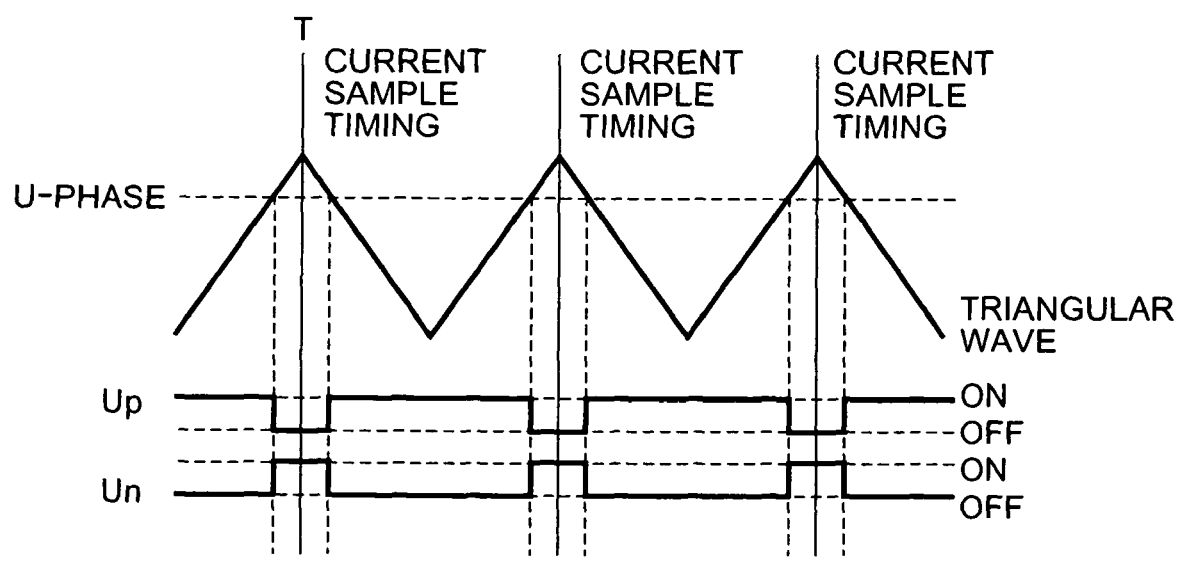
FIG. 12 is a view showing current detection timing.
Figure 13:
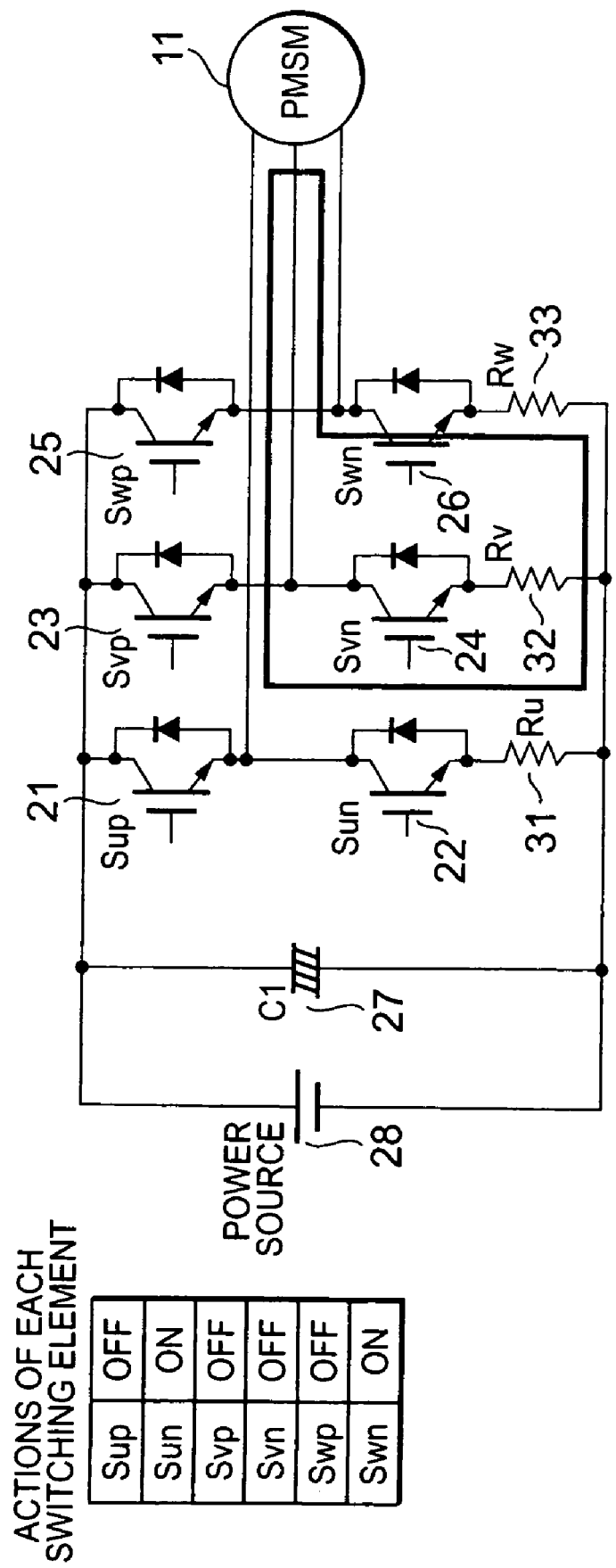
FIG. 13 is a view showing an example of a current passage at current sample timing.

FIG. 11 shows an example of a circuit diagram for measurement current maintenance (S12 in FIG. 8) which is also regarded as a preparation stage for performing the measurement (S13 in FIG. 8) for obtaining the correction value by applying the present invention. Moreover, FIG. 12 is a view for showing switching element control, and FIG. 13 is a circuit diagram at the time of the measurement. Note that FIG. 11 and FIG. 13 extract principal parts in FIG. 6 for the purpose of explanation. Before operating the motor controller shown in FIG. 6, the imbalance among the current detectors 30 such as the shunt resistance elements is measured in accordance with these circuit diagrams (FIG. 11 and FIG. 13) and the like.

Details of these drawings will be described below. FIG. 11 is the view corresponding to the FIG. 4A. That is, FIG. 11 is the view corresponding to FIG. 4A out of the drawings for turning the switching elements Sup and Sun of the U-phase on and off by the PWM control. Meanwhile, the switching elements Svp 23 and Svn 24 of the V-phase are both turned off. That is, the upper and lower switching elements of one of the phases are turned off. The switching element Swp 25 of the W-phase is turned off, and the switching element Swn 26 of the W-phase is turned on. That is, the upper switching element of the other phase is turned off, and the lower switching element thereof is turned on. A current pathway indicated with a solid line represents a view when the switching element Sup is turned on, and the switching element Sun is turned off at the time of the PWM control.

To be more precise, in the example of the pathway shown in FIG. 11, the on/off control of the switching elements of the U-phase is performed by comparing the instruction value for the U-phase of the inverter apparatus with a triangular wave as shown in FIG. 12.

In this case, at a peak (a point T in FIG. 12) of the triangular wave, for example, a control signal Un for the switching element Sun 22 is on unlike the example shown in FIG. 11. At this time, the switching element Sup 21 is turned off in response to a control signal Up. Note that these control signals are sent from the PWM controller 11 to the respective switching elements. A current pathway at this time is shown in FIG. 13. FIG. 13 corresponds to the FIG. 4B. When current sampling is executed virtually at the same time in this timing, it is possible to detect the deviation among the current detectors including the shunt resistance elements, the operational amplifiers, and the like. That is to say, the measurement of the current flowing on the shunt resistance elements is performed at the same sampling time. The reason for using the description "virtually at the same time" is because, in the case where the sampling speed is extremely fast, it is presumably possible to judge that the flowing currents have almost equal amplitudes to the extent not causing a practical problem even if the timing is not exactly the same. These measurement operations are summarized as follows. Both of the switching elements of the first phase are turned off. The switching element Sup 21 connected to the anode side of the motor-driving power source of the second phase is turned on and off. Meanwhile, the switching element connected to the anode side of the motor-driving power source of the third phase is turned off, and the switching element connected to the cathode side of the motor-driving power source of the third phase is turned on. After all, it is possible to say that the currents are supplied to the second and third phases, and the voltages on two ends of the shunt resistance element of each phase are measured. It is also possible to say that the switching element Sup 21 is turned on and off whereas the switching elements of the first and third phases are fixed to specific states.

In other words, if the current sampling is executed in accordance with the above-described measurement operations, the amplitude values of the current flowing on the two shunt resistance elements are the same as described previously concerning the principle diagrams. Therefore, the detected amplitudes of the U-phase current (Iu) and of the W-phase current (Iw) are theoretically the same provided that the current detectors including the shunt resistance elements, the operational amplifiers, and the like, have the same performances, that is, the current detectors do not have the intrinsic deviations. Conversely, if the detected amplitude values of the currents are different, then it is possible to judge that the current detectors have different performances in accordance with the proportion between the amplitude values. For example, assuming that the U-phase current (Iu) is detected to be 10 A (amperes) and the W-phase current (Iw) is detected to be 10.5 A (amperes), the current value (the amplitude value) flowing on this solid line is supposed to be equal to 10 A if the current detector of the U-phase is accurate or 10.5 A if the current detector of the W-phase is accurate.

The Related Art disclosed in Patent Documents 1 to 3 has been devoted to achieve higher accuracy and higher precision of the current detectors for each phase. In the meantime, Patent Document 4 has been configured to acquire the values of each of the phases and to perform correction by using the average value thereof.

In contrast, this embodiment is based on the assumption that it is uncertain as to which one of the current detectors is accurate, or rather, the accuracy of any of the current detectors is not questioned. In other words, how many amperes the value of the current (a momentary value irrespective of the direction of the current, i.e. the amplitude) flowing on the solid line is at that point is not known accurately. Nevertheless, the current values should be theoretically the same. Accordingly, if the performance of the current detector of the U-phase is tentatively defined as 10, then it is apparent that the relative performance of the current detector of the W-phase is 10.5. Therefore, it is only necessary to equalize the performances of the current detectors of the U-phase and the W-phase in order to correct the deviation between the current detectors. Specifically, when the U-phase is set to 1, the W-phase is adjusted to 1/1.05=0.952. For example, when the value of the U-phase is defined as a reference value (1), it is only necessary to multiply the current detection value of the W-phase by 0.952 without changing the current detection value of the U-phase. This is the explanation of the principle of the present invention on the basis of the concrete example. In the context of the foregoing explanation, it is also possible to deem the current detection value as the information obtained from the current detector, or as the output information from the current detector based on the voltage generated on the shunt resistance element.

In the three-shunt detection method, it is necessary to measure not only the deviation between the U-phase and W-phase as described above, but also the deviation between the U and V phases similarly. In this case, the W phase of the inverter is turned off, while the upper arm of the V-phase of the inverter is turned on and the lower arm thereof is turned off. Meanwhile, the U-phase may be subjected to the PWM control as previously described with reference to FIG. 11 to FIG. 13. In this way, it is possible to acquire the necessary data similar to the description with reference to the FIG. 4B. A concrete method of acquiring the data will be described below.

In the measurement period, the currents are measured just for a predetermined number of times (n) in order to reduce measurement errors (S13 in the flowchart in FIG. 8). Then, the measured currents are summed up as shown in the formulae below. The actual measurement currents fluctuate. Therefore, the number n is set to a multiple number and the number of times (the n value) is increased, so that influences such as quantization errors attributable to the AD converters can be eliminated. Naturally, the number of measurement may also be defined as a predetermined period (time duration) by using a relation with the measurement time. Meanwhile, to sum up the measured currents, momentary values can be simply accumulated as shown in formula 1 and formula 2 below. Instead, there is also a method of integrating analog data depending on the sampling time and then summing up obtained values.

$$Iu\_sum=Iu\_1+Iu\_2+\ldots,Iu\_n \quad \text{(formula 1)}$$

$$Iw\_sum=Iw\_1+Iw\_2+\ldots,Iw\_n \quad \text{(formula 2)}$$

Next, a process of calculating the correction value, i.e. a gain calculation process will be described with reference to steps starting from S14 in the flowchart in FIG. 8 and to FIG. 9. At the calculation stage S3 shown in FIG. 9, an average value of the measured current is obtained first (S14 in FIG. 8). Note that a combination of formulae shown below represents just one example. Here, the measurement is carried out for two pathways based on the U-phase. That is, a value Iu_ave_uv represents a pathway 1 which corresponds to the measurement between the U-phase and V-phase. Meanwhile, a value Iu_ave_uw represents a pathway 2 which corresponds to the measurement between the U-phase and W-phase.

$$Iu\_ave\_uv=Iu\_sum\_uv/n \text{ (measurement between } U \text{ and } V) \quad \text{(formula 3)}$$

$$Iu\_ave\_uw=Iu\_sum\_uw/n \text{ (measurement between } U \text{ and } W). \quad \text{(formula 4)}$$

$$Iv\_ave=Iv\_sum/n \quad \text{(formula 5)}$$

$$Iw\_ave=Iw\_sum/n \quad \text{(formula 6)}$$

Next, a process for obtaining gain value G of each phase will be described. Here, the gain value G functions as a scale for correcting the deviations among the current detectors, such as the three shunt resistance elements, based on the U-phase. In other words, this is the process for obtaining the gain values G that constitute the scales of the deviations among the current detectors including the amplifiers of each phase. Formulae 7 to 9 are formulae in the course of the calculation for standardization based on the U-phase, i.e. in the case of calibrating a value ($G_{31}$) directly obtained from the current detector of the U-phase as a gain which is equal to 1. A value $G_{32}$ is calculated by using formula 8, and a value $G_{33}$ is calculated by using formula 9:

$$G_{31}=1.0 \quad \text{(formula 7)}$$

$$G_{32}=Iv\_ave/Iu\_ave\_uv \quad \text{(formula 8)}$$

$$G_{33}=Iw\_ave/Iu\_ave\_uw \quad \text{(formula 8)}$$

Next, the gain values of the other phases are calculated and standardized while defining the gain value of the U-phase tentatively equal to 1. Then, the gain values are obtained by comparing the standardized values. This process includes the following procedures. First, an average value of the gain values of the three phases is calculated:

$$G\_ave=(G_{31}+G_{32}+G_{33})/3 \quad \text{(formula 10)}$$

Next, the gain values of the respective phases are obtained by executing calculations as shown in formula 11 to formula 13 below. That is, the gain value of the U-phase is calculated by formula 11, the gain value of the V-phase is calculated by formula 12, and the gain value of the W-phase is calculated by formula 13:

$$G\_u=G\_ave/G_{31} \quad \text{(formula 11)}$$

$$G\_v=G\_ave/G_{32} \quad \text{(formula 12)}$$

$$G\_w=G\_ave/G_{33} \quad \text{(formula 13)}$$

Figure 14:
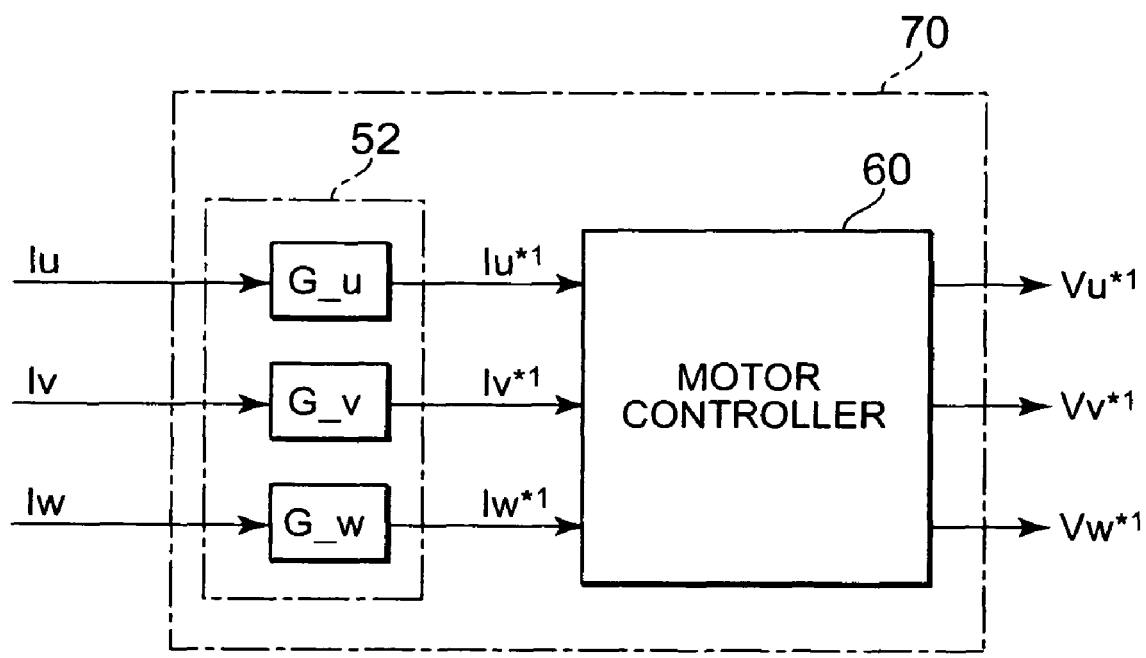
FIG. 14 is a block diagram showing an normal control process.

The gain calculation shown in S17 in FIG. 8 is thus completed. Thereafter, gain setting is performed in S18 using these values whereby the correction program is completed in S19. Here, the concrete example of gain setting is stored in an unillustrated storage unit such as a memory included in the current detector correction unit 52, for example. Then, the obtained gain values are defined as gain correction values as shown in S30 in FIG. 8. In the normal operation, as shown in FIG. 14, the current data Iu and other values from the AD converters are multiplied by these gain values (G_u and the like), thereby obtaining corrected current data to be inputted to the motor controller. Here, reference numeral 70 is grasped as the current detector correction unit-incorporated motor controller. Note that the current detector correction unit 52 does not necessarily need to be located in a certain position inside the microcomputer 50. Moreover, it is also possible to interpret that a location storing the gain values constitutes part of the current detector correction unit 52. Needless to say, it is also possible to store the gain values in a different location of the microcomputer 50. Here, the gain values and the gain correction values stated herein may also be regarded in a broad sense as correction values for correcting the information obtained from the current detectors. Further, the correction values required by the controller 60 may also be regarded as the values for equalizing the output values from the current detectors based on the voltage generated on each shunt resistance elements.

(Modified Example of the First Embodiment Concerning Gain Setting)

The description has been made in the gain setting process (S18) that the gain values are stored in the current detector correction unit 52. However, in reality, the controller may encompass various modified forms including the current detector correction unit-incorporated motor controller 70 as shown in FIG. 6, a program in the form of a built-in program inside the LSI of the microcomputer 50, incorporated storage means, operation by the microcomputer 50 by acquiring a program from outside, and so forth. The illustration in FIG. 6 is merely intended for explaining the first embodiment simply. Therefore, in a broad sense, it is also possible to say that the gains are retained in the memory of the microcomputer 50 constituting the controller for the switching elements.

(Another Modified Example Concerning Gain Values)

As described above, the average value is obtained beforehand in order to correct each of the phases based on the average value of the uneven three phases. From the viewpoint of merely eliminating the deviation, it is also possible to calculate the gain value of each phase directly as shown in formulae 14 to 16 based on the U-phase, for example, without using formula 10. In other words, any value can be defined as a benchmark as long as equalization of the detecting performances of the current detectors is intended. Nevertheless, from a practical point of view, it is preferable to calculate the gain value of each phase based on the average value of the three phases in terms of management for enhancing reliability of the data control including error management and error detection to be described later:

$$G\_u = 1.0 \tag{formula 14}$$

$$G\_v = 1.0/G_{32} \tag{formula 15}$$

$$G\_w = 1.0/G_{33} \tag{formula 16}$$

Here, the gain values calculated by formulae 14 to 16 will be referred to as directly calculated gain values in order to distinguish these values from the gain values calculated by formulae 11 to 13. In the actual control, it is possible to achieve the control by using any set of those values. Therefore, it is needless to say that the gain values as cited in the claims of the present invention may be any of the set of the gain values calculated by formulae 11 to 13 and the set of the directly calculated gain values. Moreover, the gain values may be another set of values calculated by using other formulae designed to solve the deviations among the phases by executing similar calculation.

In the case of the normal operation, i.e. the normal control, S01 in the flowchart of FIG. 8 results in NO, and the gain correction values are acquired in S30. Specifically, in the normal control stage S4 shown in FIG. 9, the motor control is performed as shown in FIG. 11 by multiplying the gain values for correcting the current detectors such as the shunt resistance elements. Then, values Iu, Iv, and Iw that are the current detection values received from the AD converters 51 are multiplied by the gain values to obtain current detection values I'u, I'v, and I'w after gain correction. These values are used for the normal control. The acquisition of the gain correction value stated in S30 in FIG. 8 briefly describes the process for multiplying the current detection value of each phase received from the AD converters 51 by the gain value of the corresponding phase and thereby acquiring the current detection values after gain correction. That is, S30 in FIG. 8 represents the process for acquiring the currents after gain correction. Here, in the normal control of the motor as shown in FIG. 7, the motor controller controls the motor based on values (such as iu' in FIG. 6) obtained by multiplying current values (such as iu in FIG. 6) from the AD converters 51 respectively by these gain values.

Second Embodiment

Figure 15:
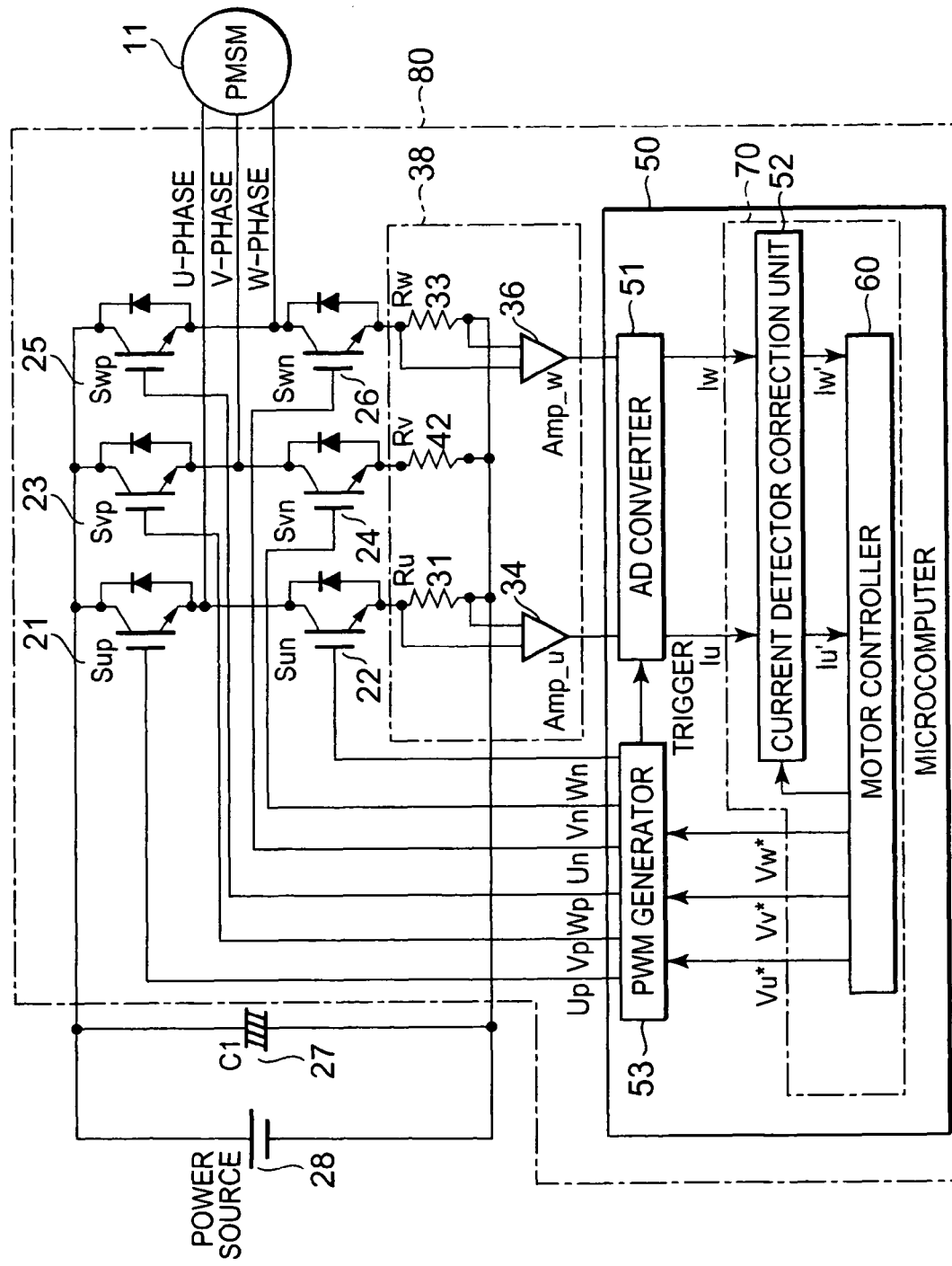
FIG. 15 is a block diagram showing a configuration of an inverter apparatus according to a second embodiment of the present invention.

The present invention has been described above in detail by using the three-shunt detection method as the example. Now, the two-shunt detection method will be briefly described with reference to FIG. 15. An inverter apparatus 80 shown in FIG. 15 includes current detectors 38 provided with only two amplifiers. That is, a major difference from FIG. 6 of the first embodiment is lack of the amplifier in the V-phase. Although a resistance element 42 is provided in the current detectors 38, this is another difference from the first embodiment because this is not the shunt resistance element as the current detector but is the resistance element intended to maintain the balance among the phases by simply equalizing a voltage drop relative to the U-phase and the W-phase as much as possible. Here, it is also possible to omit the resistance element 42. Other features are similar to the first embodiment, and further description on FIG. 15 will therefore be omitted. Moreover, in the two-shunt detection method, the publicly-known relation of the three-phase currents expressed by iu+iv+iw=0 is applied. Therefore, when the current values of the two phases are detected, it is possible to determine the current value of the remaining phase by means of calculation. For example, when only the U-phase and the W-phase are each provided with the shunt resistance element, the value of the V-phase is defined as iv=−(iu+iw) as publicly known, i.e. defined as a negative value of a sum of momentary current values of the U-phase and the W-phase considering the orientations thereof (i.e. the momentary values considering positive and negative codes).

In this case, correction of the deviation is executed as follows. For example, the measurement current is supplied to the U-phase and the W-phase, and measurement is performed for n times by using the method described in the first embodiment. In this case, sums of the detected currents of the U-phase and the W-phase after performing n times of measurement are expressed by formulae 20 and 21:

$$Iu\_\text{sum} = Iu\_1 + Iu\_2 + \ldots, Iu\_n \tag{formula 20}$$

$$Iw\_\text{sum} = Iw\_1 + Iw\_2 + \ldots, Iw\_n \tag{formula 21}$$

Therefore, average value of the currents on each of the phases are respectively expressed by formulae 22 and 23:

$$Iu\_ave = Iu\_\text{sum}/n \tag{formula 22}$$

$$Iw\_ave = Iw\_\text{sum}/n \tag{formula 23}$$

Formula 24 is derived from an attempt to balance the average values of errors of the current detectors such as the two shunt resistance elements:

$$G\_ave = (Iu\_ave + Iw\_ave)/2 \tag{formula 24}$$

Therefore, the gain value for the current detector of the U-phase and the gain value for the current detector of the W phase are derived as shown in formulae 25 and 26, respectively:

$$G\_u = G\_ave/Iu\_ave \tag{formula 25}$$

$$G\_w = G\_ave/Iw\_ave \tag{formula 26}$$

Accordingly, the currents after correction are calculated as follows:

$$Iu' = G\_u \times Iu \tag{formula 27}$$

$$Iw' = G\_w \times Iw \tag{formula 28}$$

Here, it is publicly known that Iv'=−(Iu'+Iw') holds true. Therefore, it is unnecessary to detect the current of the V-phase directly. The current of the V-phase can be calculated by assigning the values calculated by formulae 27 and 28 to this formula.

Third Embodiment

The first embodiment and the second embodiment have described the example of using the PWM method in order to obtain the measurement circuit shown in FIG. 4B. However, it is not always necessary to use the PWM method. It is also possible to apply a method using a single pulse as described below.

Figure 16:
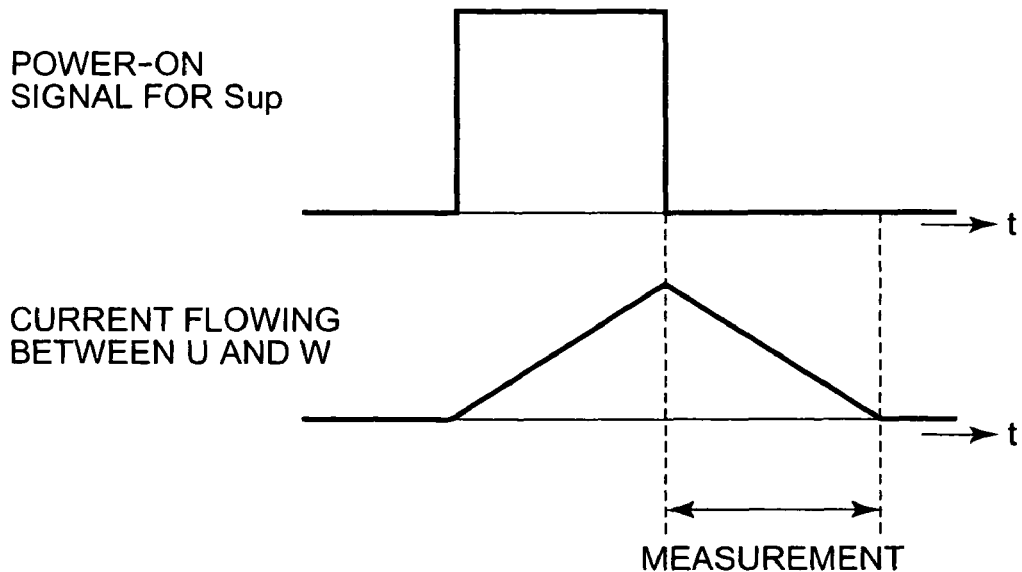
FIG. 16 is a pulse chart showing a case of performing current measurement with one pulse.

FIG. 16 shows the method using the single pulse. In short, means for controlling the switching elements Sup 21 and Sun 22 is different from the first embodiment. Other features are the similar to the first embodiment. Accordingly, only the different features will be described below in detail for avoidance of overlapping explanation. Specifically, the method corresponding to FIG. 4A is shown in FIG. 11 while the method corresponding to FIG. 4B is shown in FIG. 13. Moreover, FIG. 12 showing the control of the switching elements Sup 21 and Sun 22 is replaced by FIG. 15.

This control method will now be described in detail. First, the switching element Sup 21 is turned on for a predetermined period by applying a power-on signal shown in FIG. 16. Next, after turning off the switching element Sup 21, the switching element Sun 22 is turned on by applying an unillustrated control signal. Thereafter, a current that flows as shown in FIG. 16 is measured. Other features are similar to the first embodiment, and description will therefore be omitted. Here, it is by all means possible to apply the two-shunt detection method described in the second embodiment.

In this way, instead of using accurate shunt resistance elements, it is possible to use low-price shunt resistance elements such as shunt resistance elements having some errors, or in an extreme case, shunt resistance elements made of a conductive wire or a resistance wire as long as such resistance elements satisfy current capacity requirements without causing conspicuous magnetic induction. Moreover, it is not always necessary to use highly-accurate operational amplifiers. The operational amplifiers only need to have substantially the same temperature coefficient. It is further possible to allow some deviation or variation in the value of the temperature coefficient by obtaining correction values periodically when the motor is in operation.

When a reference value is defined as 1, the gain value is normally deviated only within several tens of percent at the maximum. If the correction value (the gain value) of the current detector such as the shunt resistance elements is extremely large, then it is possible to speculate the presence of a motor breakdown, a connection problem, an inverter failure, an anomaly in the current detection circuit, and so forth. Therefore, it is also possible to use the correction value (the gain value) for a failure diagnosis. In other words, it is conceivable that the gain value fluctuates widely in the case of disconnection, deterioration, abnormal rise in temperature at a specific region or the like. Therefore, it is possible to achieve highly accurate and highly reliable management inexpensively by providing the inverter apparatus with functions to manage the gain values within a certain range and to alarm or stop the apparatus if the gain values exceed the range, for example.

Moreover, in the case of a refrigerating and air-conditioning machine or a compressor driver employing this inverter apparatus, for example, it is possible to observe variation of performances of a motor with time by displaying or outputting the correction values such as the gain values and the average values of the phases for calculating the gain values. In this way, there is also an effect of achieving highly reliable management of the apparatus.

There are more effects as described below. First, when the present invention is applied to a permanent magnet synchronous motor, it is possible to align a position of a rotator by using the measurement current. In the case of sensorless drive, there is an effect of smooth initiation.

Figure 17:
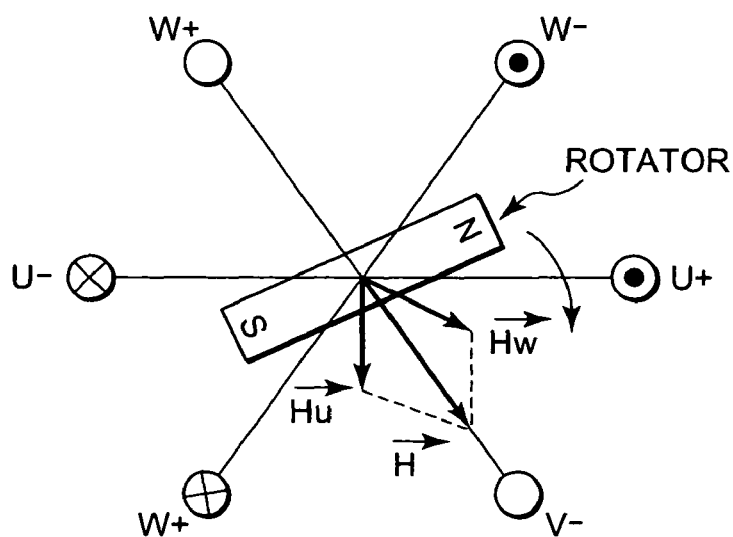
FIG. 17 is a schematic diagram showing a unique effect in the case of applying the present invention to position sensorless control.

This effect will be described with reference to FIG. 17. FIG. 17 is an explanatory view on the assumption that a positive current flows on the U-phase and a negative current having the same amplitude flows on the W-phase when measuring resistance between the U-phase and W-phase. As shown in the drawing, a magnetic field is generated along a direction of a coil of the V-phase, whereby a rotator is fixed in the direction of the coil of the V-phase. That is, the rotator is fixed in a specific position prior to normal operation.

A specific effect of this configuration is as follows. A typical motor control system is able to measure a position of a rotator by use of a rotator position sensor and thereby to achieve smooth initiation. However, there is also a technique called position sensorless control that does not use a position sensor because there is no space for fitting the position sensor in the case of a compressor, for example, or due to a high price of the position sensor. In the position sensorless control, the position is estimated by use of speed electromotive force generated when the motor is rotating. Therefore, it is not possible to estimate the position when the motor is stopped unless any special countermeasure is provided. Each embodiment of the present invention can solve this problem.

That is, in the case of any of the embodiments of the present invention, it is possible to fix the position of the rotator by using the measurement current at the correction stage prior to the normal operation. As a result, there is a remarkable effect that it is possible to achieve smooth initiation by initiating while assuming that the rotator is in that position (the coil of the V-phase, for example).

Another effect is that it is not necessary to adjust values of current detectors of each inverter apparatus at an inspection stage in a mass production process. Accordingly, an inspection process can be eliminated.

The embodiments have described the method of obtaining the correction values for the current detectors every time after the power is supplied to the inverter apparatus. However, the present invention is not limited only to this configuration. Instead, it is possible to obtain the correction values only once in the beginning before shipment, for example. Then, these correction values are stored in a non-volatile memory unlike a DRAM (dynamic random access memory) so that the inverter apparatus can be operated by applying the correction values during normal operation. Even in this case, it is still possible to obtain the correction values for the current detectors after a lapse of a predetermined time period. In this case, it is possible to select a measure in which, for example, an instruction is inputted from an unillustrated device outside the inverter apparatus, and then upon reception of the instruction, the inverter apparatus obtains the correction values.

Although the inventions has been described above in connection with several preferred embodiments thereof, it will be appreciated by those skilled in the art that those embodiments are provided solely for illustrating the invention, and should not be relied upon to construe the append claims in a limiting sense.

What is claimed is:

1. An inverter apparatus configured to operate a polyphase motor, comprising:
   a plurality of switching elements configured to control power feeding to each phase of said polyphase motor, wherein each of said phase has a first switching element coupled to a first power line and a second switching element coupled to a second power line, the second power line having lower voltage than of the first power line;

a plurality of current detectors each including a shunt resistance element and being provided on at least two phases of said polyphase motor; and a controller coupled to said switching elements and said current detectors to control said switching elements and to calculate a correction value based on information obtained from said current detectors, wherein when said controller calculates the correction value, said current detectors said controller sets two of said second switching elements coupled to said current detectors to an ON state and sets the other switching elements to an OFF state.

2. The inverter apparatus according to claim 1, wherein said controller performs calculation necessary for controlling said polyphase motor based on said correction value during normal operation of said polyphase motor.

3. An inverter apparatus operates a three-phase motor comprising:

switching elements control power feeding to each phase of said three-phase motor;

current detectors each having a shunt resistance element and being provided on at least two phases of said three phases; and a controller controls the switching elements, wherein said controller controls said switching elements to render one phase of said three phases nonconductive and to supply currents to said two phases each include said current detector, and calculates a correction value based on information obtained from said current detectors, wherein each of said phases includes two of said switching elements, and when said controller calculates said correction value based on said information obtained from said current detectors, said controller supplies said currents to second and third phases by turning off both of said switching elements of a first phase, turning on and off said switching element connected to an anode side of a motor-driving power source of said second phase, turning off said switching element connected to said anode side of said motor-driving power source of said third phase, and turning on said switching element connected to a cathode side of said motor-driving power source of said third phase, and measures a voltage between both ends of each of said shunt resistance elements.

4. An inverter apparatus operates a three-phase motor comprising:

switching elements control power feeding to each phase of said three-phase motor;

current detectors each having a shunt resistance element and being provided on at least two phases of said three phases; and a controller controls the switching elements, wherein said controller controls said switching elements to render one phase of said three phases nonconductive and to supply currents to said two phases each include said current detector, and calculates a correction value based on information obtained from said current detectors, wherein said information obtained from said current detectors is output from said current detectors based on voltages generated on said respective shunt resistance elements, and said correction value calculated by said controller is a gain value set up for equalizing an output value from each of said current detectors based on said voltages generated on said corresponding shunt resistance elements.

5. The inverter apparatus according to claim 4, wherein said controller further comprises a storage unit configured to store said gain value, and during normal operation of said three-phase motor, said controller recognize phase currents of said three-phase motor by multiplying said output value from each of said current detectors by said gain value, and performs a calculation process for controlling said switching element based on said recognized phase currents, and thus obtains a control signal for each of said switching element.

6. The inverter apparatus according to claim 5, wherein said controller instructs said three-phase motor, based on said gain values, to perform at least any one of output of an alarm, display of said alarm, and emergency stop process.

7. An inverter apparatus operates a three-phase motor comprising:

switching elements control power feeding to each phase of said three-phase motor;

current detectors each having a shunt resistance element and being provided on at least two phases of said three phases; and a controller controls the switching elements, wherein said controller controls said switching elements to render one phase of said three phases nonconductive and to supply currents to said two phases each include said current detector, and calculates a correction value based on information obtained from said current detectors, wherein said controller supplies current having identical amplitude to said two phases when finding said correction value based on said information obtained from said current detectors.

8. A semiconductor device being used for an inverter apparatus operates a three-phase motor comprising:

a controller configured to control said switching elements, wherein said inverter apparatus includes switching elements control electric power distribution to each phase of said three-phase motor, and current detectors each having a shunt resistance element and being provided on at least two phases out of said three phases, wherein said controller controls said switching elements to render one phase of said three phases nonconductive and to supply currents to said two phases each includes said current detector, and calculates a correction value based on information obtained from said current detectors, wherein, when said controller calculates said correction value based on said information obtained from said current detectors, said controller supplies said currents to second and third phases by turning off both of said switching elements of a first phase, turning on and off said switching element connected to an anode side of a motor-driving power source of said second phase, turning off said switching element connected to said anode side of said motor-driving power source of said third phase, and turning on said switching element connected to a cathode side of said motor-driving power source of said third phase, and measures a voltage between both ends of each of said shunt resistance elements.

9. The semiconductor device according to claim 8, wherein said controller performs calculation necessary for controlling said three-phase motor based on said correction value during normal operation of said three-phase motor.

10. A semiconductor device being used for an inverter apparatus operates a three-phase motor comprising:

a controller configured to control said switching elements, wherein said inverter apparatus includes:

switching elements control electric power distribution to each phase of said three-phase motor, and current detectors each having a shunt resistance element and being provided on at least two phases out of said three phases, wherein said controller controls said switching elements to render one phase of said three phases nonconductive and to supply currents to said two phases each includes said current detector, and calculates a correction value based on information obtained from said current detectors, wherein said information obtained from said current detectors is output information from said current detectors based on voltages generated on said respective shunt resistance elements, and said correction value calculated by said controller is a gain value set up for equalizing an output value from each of said current detectors based on said voltages generated on said corresponding shunt resistance elements.

11. A method of starting operation of a three-phase motor having an information correcting function for current detectors of a three-phase motor provided with said current detectors each having a shunt resistance element and being provided on at least two phases out of said three phases, and switching elements, said method comprising:

supplying a measurement current for correction of output from each of said current detectors before normal operation of said three-phase motor;

obtaining information from said current detectors of said two phases, after supplying said measurement current, by supplying currents to said two phases of said three-phase motor each provided with said current detector while stopping said current supply to said remaining phase;

calculating a correction value based on said obtained information; and causing said three-phase motor to perform normal operation based on said correction value.

12. The method of starting operation of a three-phase motor according to claim 11, wherein said information obtained from said current detectors is output information from said current detectors based on voltages generated on said respective shunt resistance elements, and said calculating a correction value calculates a gain value for equalizing a value of said information from each of said current detectors.

13. The method of starting operation of a three-phase motor according to claim 11, wherein said causing said three-phase motor to perform normal operation operates said three-phase motor by multiplying said correction value by detected values of said current detectors which are obtained in an normal operating state where currents are supplied to each phase of said three-phase motor.

* * * * *